US 8,543,911 B2

(12) United States Patent
Mansfield et al.

(10) Patent No.: US 8,543,911 B2
(45) Date of Patent: Sep. 24, 2013

(54) ORDERING DOCUMENT CONTENT BASED ON READING FLOW

(75) Inventors: Philip Andrew Mansfield, Vancouver (CA); Michael Robert Levy, Vancouver (CA); Derek B. Clegg, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 5 days.

(21) Appl. No.: 13/109,921

(22) Filed: May 17, 2011

(65) Prior Publication Data

US 2012/0185766 A1 Jul. 19, 2012

Related U.S. Application Data

(60) Provisional application No. 61/433,951, filed on Jan. 18, 2011, provisional application No. 61/433,952, filed on Jan. 18, 2011.

(51) Int. Cl.
*G06F 17/00* (2006.01)

(52) U.S. Cl.
USPC ............................. 715/247; 715/243; 715/246

(58) Field of Classification Search
USPC .......................................... 715/243, 246, 247
See application file for complete search history.

(56) References Cited

U.S. PATENT DOCUMENTS

| | | | |
|---|---|---|---|
| 5,335,290 A | 8/1994 | Cullen et al. | |
| 5,379,373 A | 1/1995 | Hayashi et al. | |
| 5,390,259 A | 2/1995 | Withgott et al. | |
| 5,553,217 A | 9/1996 | Hart et al. | |
| 5,555,556 A | 9/1996 | Ozaki | |
| 5,633,996 A | 5/1997 | Hayashi et al. | |
| 5,669,007 A | 9/1997 | Tateishi | |
| 5,680,478 A | 10/1997 | Wang et al. | |
| 5,708,730 A | 1/1998 | Itonori | |
| 5,774,580 A | 6/1998 | Saitoh | |
| 5,784,487 A | 7/1998 | Cooperman | |
| 5,841,900 A | 11/1998 | Rahgozar et al. | |

(Continued)

FOREIGN PATENT DOCUMENTS

| | | |
|---|---|---|
| AU | 2012200144 | 1/2012 |
| EP | 0779594 | 6/1997 |

(Continued)

OTHER PUBLICATIONS

Portions of prosecution history of U.S. Appl. No. 12/455,866, Oct. 7, 2011, Levy, Michael Robert et al.

(Continued)

*Primary Examiner* — Doug Hutton, Jr.
*Assistant Examiner* — Andrew Dyer
(74) *Attorney, Agent, or Firm* — Adeli & Tollen LLP

(57) ABSTRACT

For a page that has been decomposed into a set of primitive areas, a novel method for organizing the set of primitive areas into an ordered list is disclosed. The primitive areas in the ordered list are initially sorted using start point order relation ordering, which compares the start points of the primitive areas in the coordinate system of the page. The ordering of the primitive areas in the ordered list are then refined by using contextual order relation ordering, which compares primitive areas against each other according to coordinate systems local to the primitive areas being compared. A new ordered list is then created by transposing primitive areas that are incorrectly ordered according to contextual order relation ordering.

20 Claims, 27 Drawing Sheets

(56) References Cited

U.S. PATENT DOCUMENTS

| | | | |
|---|---|---|---|
| 5,848,184 | A | 12/1998 | Taylor et al. |
| 5,848,186 | A | 12/1998 | Wang et al. |
| 5,856,877 | A | 1/1999 | Burger et al. |
| 5,907,631 | A | 5/1999 | Saitoh |
| 6,014,680 | A | 1/2000 | Sato et al. |
| 6,125,362 | A | 9/2000 | Elworthy |
| 6,173,073 | B1 | 1/2001 | Wang |
| 6,175,844 | B1 | 1/2001 | Stolin |
| 6,377,704 | B1 | 4/2002 | Cooperman |
| 6,408,094 | B1 | 6/2002 | Mirzaoff et al. |
| 6,504,544 | B1 | 1/2003 | Hollingsworth et al. |
| 6,542,635 | B1 | 4/2003 | Hu et al. |
| 6,562,077 | B2 | 5/2003 | Bobrow et al. |
| 6,628,832 | B2 | 9/2003 | Kanatsu |
| 6,687,404 | B1 | 2/2004 | Hull et al. |
| 6,757,870 | B1 | 6/2004 | Stinger |
| 6,801,673 | B2 | 10/2004 | Chao et al. |
| 6,904,170 | B2 | 6/2005 | Chao et al. |
| 6,910,182 | B2 | 6/2005 | Huang |
| 6,928,610 | B2 | 8/2005 | Brintzenhofe et al. |
| 6,938,204 | B1 | 8/2005 | Hind et al. |
| 7,027,071 | B2 | 4/2006 | Chao |
| 7,080,318 | B2 | 7/2006 | Devillers |
| 7,142,728 | B2 | 11/2006 | Wnek |
| 7,254,270 | B2 | 8/2007 | Simske |
| 7,313,754 | B2 | 12/2007 | McLure et al. |
| 7,328,204 | B2 | 2/2008 | Coady |
| 7,356,764 | B2 | 4/2008 | Radja et al. |
| 7,386,789 | B2 | 6/2008 | Chao et al. |
| 7,392,473 | B2 | 6/2008 | Meunier |
| 7,421,652 | B2 | 9/2008 | Yuan et al. |
| 7,433,517 | B2 | 10/2008 | Kato et al. |
| 7,441,207 | B2 | 10/2008 | Filner et al. |
| 7,555,711 | B2 | 6/2009 | Chao et al. |
| 7,623,710 | B2 | 11/2009 | Simard et al. |
| 7,634,723 | B2 | 12/2009 | Layzell |
| 7,890,852 | B2 | 2/2011 | Wason |
| 8,245,131 | B2 | 8/2012 | Chao et al. |
| 8,261,186 | B2 | 9/2012 | Mansfield et al. |
| 2001/0012400 | A1 | 8/2001 | Wang et al. |
| 2001/0043349 | A1 | 11/2001 | Bobrow et al. |
| 2002/0194379 | A1 | 12/2002 | Bennett et al. |
| 2003/0014442 | A1 | 1/2003 | Shiigi et al. |
| 2003/0046318 | A1 | 3/2003 | Schohn et al. |
| 2004/0003349 | A1 | 1/2004 | Ostertag et al. |
| 2004/0006742 | A1 | 1/2004 | Slocombe |
| 2004/0017941 | A1 | 1/2004 | Simske |
| 2004/0145593 | A1 | 7/2004 | Berkner et al. |
| 2004/0146199 | A1 | 7/2004 | Berkner et al. |
| 2004/0194035 | A1 | 9/2004 | Chakraborty |
| 2005/0076295 | A1 | 4/2005 | Simske et al. |
| 2005/0149865 | A1 | 7/2005 | Wang et al. |
| 2006/0104511 | A1 | 5/2006 | Guo et al. |
| 2006/0155700 | A1 | 7/2006 | Dejean et al. |
| 2006/0236237 | A1 | 10/2006 | Peiro et al. |
| 2006/0242166 | A1 | 10/2006 | Larcheveque et al. |
| 2006/0248070 | A1 | 11/2006 | Dejean et al. |
| 2006/0256388 | A1 | 11/2006 | Erol et al. |
| 2006/0271847 | A1 | 11/2006 | Meunier |
| 2006/0288278 | A1 | 12/2006 | Kobayashi |
| 2006/0288279 | A1 | 12/2006 | Yacoub et al. |
| 2007/0002054 | A1 | 1/2007 | Bronstein |
| 2007/0009161 | A1 | 1/2007 | Hollingsworth |
| 2007/0038927 | A1 | 2/2007 | Dallett et al. |
| 2007/0061384 | A1 | 3/2007 | Harrington et al. |
| 2007/0136288 | A1 | 6/2007 | Shimada et al. |
| 2007/0192687 | A1 | 8/2007 | Simard et al. |
| 2007/0250497 | A1 | 10/2007 | Mansfield et al. |
| 2007/0256010 | A1 | 11/2007 | Blackmon et al. |
| 2007/0294646 | A1 | 12/2007 | Timmons |
| 2008/0104032 | A1 | 5/2008 | Sarkar |
| 2008/0201636 | A1 | 8/2008 | Fujiwara |
| 2008/0235564 | A1 | 9/2008 | Erol et al. |
| 2008/0263032 | A1 | 10/2008 | Vailaya et al. |
| 2010/0145720 | A1 | 6/2010 | Reiner |
| 2010/0174732 | A1 | 7/2010 | Levy et al. |
| 2010/0174975 | A1 | 7/2010 | Mansfield et al. |
| 2010/0174976 | A1 | 7/2010 | Mansfield et al. |
| 2010/0174977 | A1 | 7/2010 | Mansfield et al. |
| 2010/0174978 | A1 | 7/2010 | Mansfield et al. |
| 2010/0174979 | A1 | 7/2010 | Mansfield et al. |
| 2010/0174980 | A1 | 7/2010 | Mansfield et al. |
| 2010/0174982 | A1 | 7/2010 | Mansfield et al. |
| 2010/0174983 | A1 | 7/2010 | Levy et al. |
| 2010/0174985 | A1 | 7/2010 | Levy et al. |
| 2010/0175034 | A1* | 7/2010 | Tsurumoto ...................... 716/5 |
| 2010/0232690 | A1 | 9/2010 | Kanatsu et al. |
| 2012/0185765 | A1 | 7/2012 | Mansfield et al. |
| 2013/0042172 | A1 | 2/2013 | Mansfield et al. |

FOREIGN PATENT DOCUMENTS

| | | |
|---|---|---|
| EP | 2374067 | 10/2011 |
| EP | 2477122 | 7/2012 |
| JP | 2005/149269 | 6/2005 |
| KR | 10-2010-0033412 | 3/2010 |
| WO | WO 2009/026508 | 2/2009 |
| WO | WO 2010/078475 | 7/2010 |
| WO | PCT/US2012/021385 | 1/2012 |
| WO | WO 2012/099801 | 7/2012 |

OTHER PUBLICATIONS

Altamura, Oronzo et al., "Transforming Paper Documents into XML Format with WISDOM++," Month Unknown, 2001, International Journal on Document Analysis and Recognition, pp. 2-17.

Beusekom, Joost Van, "Diploma Thesis: Document Layout Analysis," Image Understanding and Pattern Recognition Group, Department of Computer Science, Month Unknown, 2006, pp. 1-67, Technische Universität Kaiserslautern.

Updated portions of prosecution history of U.S. Appl. No. 12/455,866, Jun. 15, 2012, Levy, Michael Robert, et al.

Portions of prosecution history of U.S. Appl. No. 13/109,918, May 31, 2012, Mansfield, Philip Andrew, et al.

U.S. Appl. No. 13/109,918, filed May 17, 2011, Mansfield, Philip Andrew, et al.

Baird, Henry S., "Background Structure in Document Images," International Journal of Pattern Recognition & Artificial Intelligence, Oct. 1994, vol. 8, No. 5, pp. 1-18, AT&T Bell Laboratories, Murray Hill, New Jersey, USA.

Chao, Hui, et al., "Layout and Content Extraction for PDF Documents," Lecture Notes in Computer Science: Document Analysis Systems VI, Sep. 8-10, 2004, pp. 213-224, vol. 3163/2004, Springer-Verlag Berlin Heidelberg.

Hassan, Tamir, et al., "Intelligent Wrapping from PDF Documents," Proceedings of the RAWS 2005 International Workshop on Representation and Analysis of Web Space, Sep. 14-16, 2005, pp. 33-40, Czech Republic.

Hassan, Tamir, et al., "Table Recognition and Understanding from PDF Files," Ninth International Conference on Document Analysis and Recognition (ICDAR), Sep. 23-26, 2007, IEEE, Brazil.

Khramov, Yuri, et al., "Extracting Semantic Knowledge from PDF publications," XML 2001 Conference Paper, Dec. 2001, pp. 1-7, SchemaSoft, Vancouver, British Columbia, Canada.

Lovegrove, William S., et al., "Document Analysis of PDF Files: Methods, Results and Implications," Electronic Publishing, Jun. & Sep. 1995, pp. 207-220, vol. 8(2&3), John Wiley & Sons, Ltd.

Namboodiri, Anoop M., et al., "Document Structure and Layout Analysis," Digital Document Processing, Mar. 13, 2007, pp. 29-48, Springer London, International Institute of Information Technology, Hyderabad, India and Michigan State University, East Lansing, MI—48824, USA.

Namboodiri, Anoop, et al., "Document Structure and Layout Analysis," Advances in Pattern Recognition, Digital Document Processing, Month Unknown, 2007, ISSN:1617-7916, DOI 10.1007/978-1-84628-726-8, ISBN 978-1-84628-501-1, pp. 1-17, International Institute of Information Technology, Hyderabad, India and Michigan State University, East Lansing, MI—48824, USA.

O'Gorman, Lawrence, "The Document Spectrum for Page Layout Analysis," IEEE Transactions on Pattern Analysis and Machine Intelligence, Nov. 1993, vol. 15, Issue: 11, pp. 1162-1173, AT&T Bell Laboratories, Murray Hill, New Jersey, USA.

International Search Report and Written Opinion of PCT/US2012/021385, May 2, 2012 (mailing date), Apple Inc.

Extended European Search Report of EP 12150990, May 21, 2012 (date of completion), Apple Inc.

Breuel, Thomas M., "High Performance Document Layout Analysis," Proceedings of Symposium on Document Image Understanding Technology, Apr. 9-11, 2003, pp. 1-15, University of Maryland, Maryland, USA.

Rigamonti, Maurizio, et al., "Towards a Canonical and Structured Representation of PDF Documents through Reverse Engineering," Proceedings of the Eighth International Conference on Document Analysis and Recognition (ICDAR'05), Aug. 29-Sep. 1, 2005, 5 pages, IEEE Computer Society, Washington, DC, USA.

Etemad, Kamran, et al., "Multiscale Segmentation of Unstructured Document Pages Using Soft Decision Integration," IEEE Transactions on Pattern Analysis and Machine Intelligence, Jan. 1997, pp. 92-96, vol. 19, No. 1, IEEE.

Klink, Stefan, et al., "Document Structure Analysis Based on Layout and Textural Features," International Conference on Document Analysis Systems, Month Unknown, 2000, 12 pages, Rio de Janeiro, Brazil. http://www.dfki.uni-kl.de/~kieni/publications/DAS2000_SALT.pdf.

Krishnamoorthy, Mukkai, et al., "Syntactic Segmentation and Labeling of Digitized Pages from Technical Journals," IEEE Transactions on Pattern Analysis and Machine Intelligence, Jul. 1993, pp. 737-747, vol. 15, No. 7, IEEE.

U.S. Appl. No. 13/729,015, filed Dec. 27, 2012, Apple Inc.

Portions of prosecution history of AU2012200144, Jan. 18, 2013 (mailing date), Apple Inc.

* cited by examiner

ORDERING DOCUMENT CONTENT BASED ON READING FLOW

CLAIM OF BENEFIT TO PRIOR APPLICATIONS

The present application claims the benefit of U.S. Provisional Patent Application 61/433,951, entitled "Reconstruction of Lists, Ordering Page Content, Storing Multiple Representations for a Document, and Adaptive Graphic Objects," filed Jan. 18, 2011. The present application also claims the benefit of U.S. Provisional Patent Application 61/433,952, entitled "Ordering and Selecting Page Content," filed Jan. 18, 2011. All of the above-mentioned provisional applications are incorporated herein by reference.

CROSS REFERENCE TO RELATED APPLICATIONS

This application is related to the following application: U.S. patent application Ser. No. 13/109,918, filed May 17, 2011.

BACKGROUND

Documents are often defined as nothing more than a collection of primitive elements that are drawn on a page at defined locations. For example, a PDF (portable document format) file might not have structural definition, but instead, might have nothing more than instructions to draw glyphs, shapes, and bitmaps at various locations.

A user can view such a document on a standard monitor and deduce the structure. However, because such a file is only a collection of primitive elements, a document viewing application has no knowledge of the intended structure of the document. The application displaying the document has no indication that the text groupings might have relationships to each other based on the rows and columns of the text groupings, because the document does not include such information. Similarly, the application has no indication of the flow of text through a page (e.g., the flow from one column to the next, or the flow around an embedded image), or various other important qualities that can be determined instantly by a human user.

This lack of knowledge about document structure will not always be a problem when a user is simply viewing the document on a standard monitor. However, being able to access the document and edit it as though it were a document produced by a word processor, image-editing application, etc., that has structure and relationships between elements would often be of value to a reader. A human can look at content in a page of a document and, for the most part, determine a reading order through the content. This is a task that is generally apparent to the human eye. However, such a task is not apparent to a computer application. As pages become more complex (multiple columns of text with varying orientations, as opposed to a single vertically-oriented column of text), determining an order becomes even more difficult. In addition, determining which portion of such a page a person is attempting to select is a difficult task as well.

SUMMARY

Some embodiments of the invention provide a method that organizes content of a document. For a document page with content that has been structured into primitive areas, the method organizes the content of the document page by sorting the primitive areas into an ordered list. In some embodiments, the method sorts the primitive areas into a sequence of primitive areas according a first sorting criteria and transposes successive primitive areas in the sequence according to a second sorting criteria. The method generates an ordered list based on the transposed sequence of primitive areas.

In some embodiments, the method initially sorts the primitive areas in the document using start point order relations, which compares the positions of start points of the primitive areas in the page. The method then refines the initial sorting result produced by start point order relation by using contextual order relation, which sorts primitive areas according to reading flow of content within the primitive areas. Contextual order relation defines a preceding region and a following region for each primitive area and determining whether the start point of a neighboring area is in the primitive area's following region or preceding region. The method in some embodiments generates the ordered list by initially sorting the primitive areas according to start point order relation and then transposing primitive areas that are incorrectly ordered according to contextual order relation.

Some embodiments represent each element of each primitive area by an order index in the ordered list. Order indices are assigned according to the ordering of primitive areas in the ordered list and according to the ordering of the elements within each primitive area. In instances where there are visible dividers in the page, some embodiments group the primitive areas in the ordered list according to sections imposed by visible dividers in the page. The method then assigns order indices according to the grouping of primitive areas.

Based on the ordered list, some embodiments of the invention provide a method that performs contiguous selection of document content across different primitive areas in the document. Some embodiments define a contiguous section in the ordered list by identifying the first and last primitive elements of the contiguous selection. The first primitive element is identified as the primitive element that is closest in reading flow to a start selection point on the page, while the last primitive element is identified as the primitive element that is closest in reading flow to an end selection point on the page.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail. Throughout this document, the two primary directions of reading flow (left-to-right and then top-to-bottom) are chosen based on Western languages. Specifically, some embodiments described below perform comparison in y-coordinate before comparison in x-coordinate. However, one of ordinary skill would recognize that primary directions of reading flow could be altered to accommodate documents in other languages (e.g., East Asian languages, in which the reading flow is top-to-bottom and then right-to-left). In these instances, some embodiments perform comparison in x-coordinate before comparison in y-coordinate.

Some embodiments of the invention provide a method that organizes content of a document. For a document page with content that has been structured into primitive areas, the method organizes the content of the document page by sorting the primitive areas into an ordered list. In some embodiments, the method sorts the primitive areas into a sequence of primitive areas according a first sorting criteria and transposes successive primitive areas in the sequence according to a second sorting criteria. The method generates an ordered list based on the transposed sequence of primitive areas.

Figure 1:
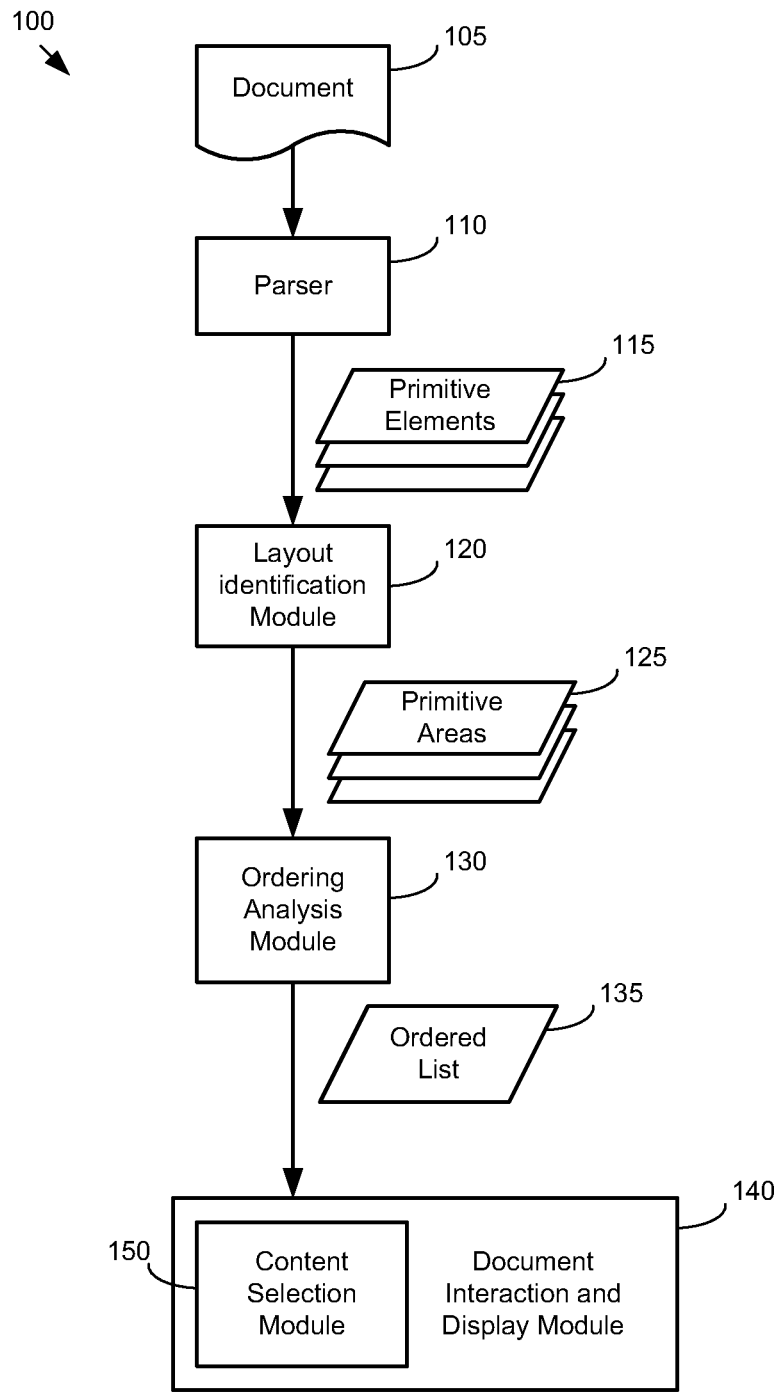
FIG. 1 conceptually illustrates an example system that structures content of an electronic document into an ordered list and facilitates selection of contiguous content in the electronic document by using the ordered list.

FIG. 1 conceptually illustrates an example system that structures content of an electronic document into an ordered list and facilitates selection of contiguous content in the electronic document by using the ordered list. FIG. 1 will be described by referencing FIGS. 2-5. FIG. 1 illustrates an example system 100 that includes a parser 110, a layout identification module 120, an ordering analysis module 130 and a document interaction and display module 140. The document interaction and display module 140 includes a selection module 150.

The parser 110 receives a document 105 and pareses it into various primitive elements such as character glyphs or images. In some embodiments, the parser receives a bitstream of a document and parses it into the primitive elements. In some embodiments, the parser 110 also recognizes graphic elements such as photographs, charts or other standalone images from the document 105. The parser 110 identifies primitive elements 115 based on the recognized data elements and their geometric positions in the document. In some embodiments, the primitive elements 115 being parsed out by the parser also includes higher level information about the content in the page such as words, text lines, paragraphs, and columns. In some embodiments, the system 100 does not include the parser 105 so that the layout identification module 120 instead receives the primitive elements 115 directly.

The layout identification module 120 receives the primitive elements 115 and structures the received primitive elements into a collection of primitive areas 125. In some embodiments, primitive areas are higher level data structures used to model the content of the page. Primitive areas on a page can overlap each other. Each of these areas can be arbitrarily positioned, rotated, and otherwise transformed by its own affine transformation. These areas include layout areas, standalone shapes, standalone images, and (potentially nested) groupings of areas of various categories such as section or multi-shape graphics. In some embodiments, each layout area is a succession of columns laid out from left to right, while each column is a succession of paragraphs laid out from top to bottom and each paragraph is a succession of text lines laid out from top to bottom. Each text line is a succession of words and inline graphics laid out from left to right, with words being a succession of characters laid out from left to right. Method of some embodiments for structuring primitive elements into primitive areas are described in U.S. Patent Application Publication 2010/0174985, which is incorporated herein by reference.

Figure 2:
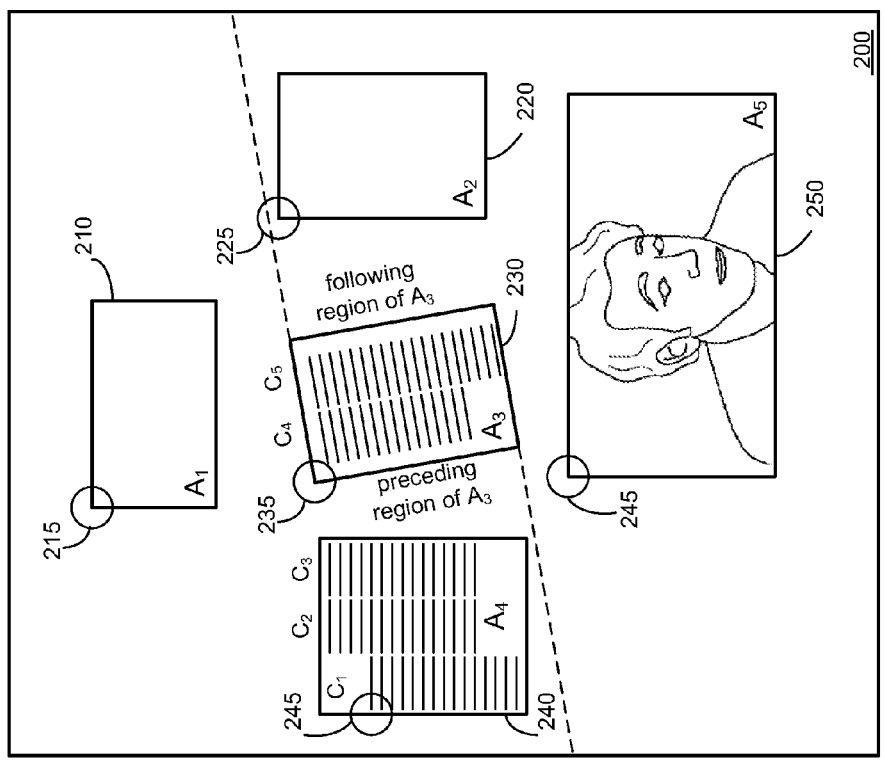
FIG. 2 illustrates a page of a document that includes several primitive areas structured from primitive elements.

FIG. 2 illustrates a page of a document that includes several primitive areas structured from primitive elements. As illustrated, the page 200 includes primitive areas 210 ($A_1$), 220 ($A_2$), 230 ($A_3$), 240 ($A_4$) and 250 ($A_5$). Primitive area 250 is a standalone image. Primitive areas 230 and 240 are layout areas that includes text. Specifically, layout area 230 includes textual columns $C_1$, $C_2$, and $C_3$ and layout area 240 includes textual columns $C_4$ and $C_5$. In some embodiments, the layout identification module is used to structure the layout area 140 from the characters in columns 241-243 and layout area 130 from the characters in columns 231 and 232.

Each of the primitive areas has a start point (primitive area 210 has start point 215, primitive area 220 has start point 225, primitive area 230 has start point 235, primitive area 240 has start point 245, primitive area 250 has start point 255). In some embodiments, the start point of a primitive area is at the primitive area's top-left corner because that is usually where the reading of the primitive area starts. In some embodiments, the start point of a layout area is the start of the text rather than the top-left corner (e.g., the start point 245 of the layout/primitive area $A_4$ is at the start of the paragraph $C_1$ instead of the top-left corner of $A_4$).

The ordering analysis module 130 of FIG. 1 receives the primitive area 125 and generates an ordered list 135 by sorting the received primitive areas. In some embodiments, the ordering analysis module performs sorting by comparing the position of the start point of the different primitive areas. Specifically the start points 215, 225, 235, 245, and 255 of the primitive areas 210, 220, 330, 240, and 250 are compared against each other to determine the ordering among the primitive areas. This is referred to as start point order relation in some embodiments. Some embodiments makes this determination by determining which primitive area's start point is closer to the top of the page (i.e., has a higher y-coordinate value). If the comparison of y-coordinates fails to determine which page should come first (e.g., two primitive areas have start points with the same y-coordinates), some embodiments use horizontal positions (i.e., x-coordinates) of start points to determine which primitive area should come first in the ordered list. In some embodiments, comparison of start point is perform in this order (i.e., top-to-bottom and then left-to-right) in order to emulate the direction of reading flow of Western Languages. One of ordinary skill would recognize that the comparison of start points can be altered to accommodate documents in other languages (e.g., East Asian languages, in which the reading flow is top-to-bottom and then right-to-left). Start point order will be further described below in Section I-A and by reference to FIG. 8.

In some embodiments the ordering analysis module 130 further refines the sorting result according to the reading flow of the primitive elements and primitive areas in the page. The orientation of a primitive area with respect to the page determines the primary reading flow of the primitive area. In some embodiments, a layout area establishes a new reading flow direction at each level in its hierarchy (e.g., columns, paragraphs, text lines, etc.,). Each established reading flow affects the ordering between primitive areas. As a result, comparing start points does not necessarily produce ordering of primitive area that is consistent with the reading flow in the page. The ordering analysis module 130 therefore refines the ordering produced by start point comparison by identifying and reordering primitive areas according to the reading flow. Sorting primitive areas according to reading flow is known as contextual relation ordering, which will be further described below in Section I-B and by reference to FIGS. 9-14.

For the example document page 200 of FIG. 2, sorting according to start point order relation would sort the five primitive areas according to the order $A_1 \rightarrow A_2 \rightarrow A_3 \rightarrow A_4 \rightarrow A_5$, since the start point of $A_1$ is higher than the start of $A_2$, the start point of $A_2$ is higher than the start point of $A_3$, the start point of $A_3$ is higher than $A_4$, and the start point of $A_4$ is higher than the start point of $A_5$. However, a human reader reading page 200 would have followed the textual flow of $A_4$ and $A_3$ and read in the order of $A_1 \rightarrow A_4 \rightarrow A_3 \rightarrow A_2 \rightarrow A_5$. Furthermore, a human reading the page 200 would have noticed that $A_3$ is tilted with respect to other primitive areas and attempt to follow the flow of the text according to the tilt or the rotation of the $A_3$.

Thus, instead of producing an ordered list based solely on start point order relations, some embodiments refine the sorting result according to contextual order relation, which establishes ordering between different primitive areas according to the reading flow within each of the primitive areas. Some embodiments performs contextual order relation sorting by defining a preceding region and a following region for each primitive area and determining whether the start point of a neighboring area is in the primitive area's following region or preceding region. The definition of the preceding region and the following region are based on the reading flow of the primitive area (thus taking into consideration the tilt of the area). In the example page 200, the preceding region of $A_3$ is defined as the area to top and to the left of $A_3$ in reading flow and the following region of $A_3$ is defined as the area to the right and to the bottom of $A_3$ in reading flow. The primitive area $A_2$ follows the layout area $A_3$ because the start point 225 of $A_2$ is in the following region of $A_3$; The layout area $A_4$ precedes the layout area $A_3$ because the start point 245 of $A_4$ is in the preceding region of $A_3$. An ordering based on contextual order relation is thus $A_1 \rightarrow A_4 \rightarrow A_3 \rightarrow A_2 \rightarrow A_5$.

Figure 3:
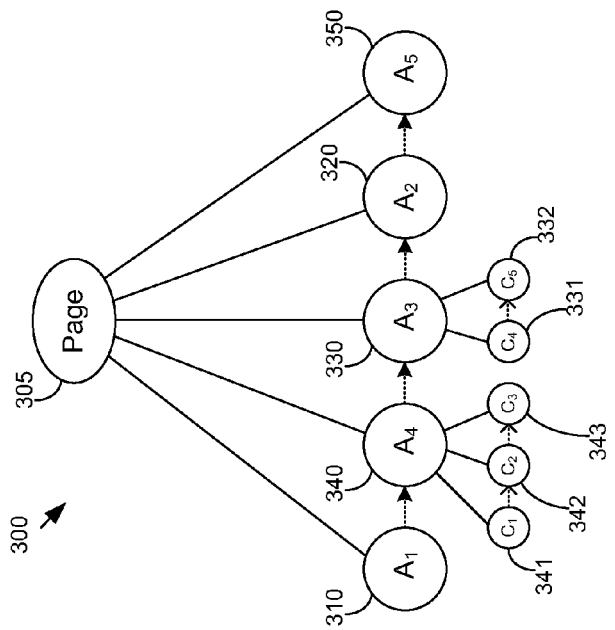
FIG. 3 conceptually illustrates an example ordered list generated from the primitive areas in a page.

FIG. 3 conceptually illustrates an example ordered list generated from the primitive areas in the page 200 of FIG. 2. The ordered list 300 illustrated in FIG. 3 is represented by a tree structure. One of ordinary skill would recognize that an ordered list can also be represented as a table, an array, a linked list, or any other data object modeling construct that can represent the sequential relationship between the primitive areas. For example, FIGS. 15 and 16 below illustrates ordered lists that are represented by arrays 1550 and 1640.

The ordered list generated from page 200 is represented by a tree structure 300 that includes a root node and several child nodes. The root node 205 corresponds to the page 210, while the child nodes 310, 320, 330, 340 and 350 correspond to the primitive areas 210, 220, 230, 240 and 250 respectively. The child node 340 has grandchild nodes 341-343 corresponding to columns 241-243. The child node 230 has grandchild nodes 331 and 332 corresponding to columns 341 and 243. The child nodes in the order list are ordered from left to right ($A_1 \rightarrow A_4 \rightarrow A_3 \rightarrow A_2 \rightarrow A_5$, as indicated by dashed arrows) according to the sorting operation performed by the ordering analysis module 130. In some embodiments, all primitive elements of one primitive area are considered to be after all primitive elements in the previous primitive area. Columns $C_1$, $C_2$ and $C_3$ of the area $A_4$ are therefore before columns $C_4$ and $C_5$ of the area $A_3$ in the ordered list 300. In some embodiments, primitive elements lower in hierarchy than columns in the area $A_4$ (e.g., paragraphs, text lines, glyphs, etc.) are also considered to be before primitive elements in the area $A_3$.

The primitive elements within a primitive area are sorted according to reading order in the primitive area. As described in U.S. Patent Application Publication 2010/0174985, which is incorporated herein by reference, one can reconstruct all of the elements of a layout area, including the reading order of the elements within the layout area, by starting with just the position and size of character glyphs and graphic primitives. The columns under $A_4$ are sorted according to the reading order $C_1 \rightarrow C_2 \rightarrow C_3$ (as indicated by dashed arrows), while the columns under $A_3$ are sorted according to reading order $C_4 \rightarrow C_5$. Since all primitive areas in the ordered list are sorted and the primitive elements within each primitive area are also sorted, the ordered list effectively links all primitive elements in one contiguous list.

In some embodiments, each element of each primitive area is represented by an order index in the ordered list. The order indices are assigned according to the ordering of primitive areas in the ordered list and according to the ordering of the document elements within each primitive area. In some embodiments, the primitive areas in the ordered list are grouped according to sections imposed by visible dividers in the page. In some of these embodiments, order indices are assigned according to the grouping of primitive areas. The grouping of primitive areas by visible dividers in a page will be further described below by reference to FIG. 16.

The document interaction and display module 140 of FIG. 1 receives the ordered list 135 generated by the ordering analysis module. In some embodiments, the document interaction and display module also receives or has access to primitive areas 125 produced by the layout identification module 120 and primitive elements 115 extracted by the parser 110. Based on the received ordered list and/or primitive elements and areas, the document interaction and display module 140 enables the display of the contents of the document and facilitates interaction with the document.

In some embodiments, the document interaction and display module includes a content selection module 150, which performs functionalities such as selection, searching, navigating, reflowing, copying/pasting, converting, or editing of content in the document. Methods for performing these software functionalities within one particular layout area are described in U.S. Patent Application Publication 2010/0174983, which is incorporated herein by reference. By using the ordered list 135, the content selection module 150 also performs these operations for document content across different primitive areas.

In some embodiments, the content selection module 150 defines a selection of document content by referencing the primitive elements in the ordered list. Since the ordered list links all primitive elements in one contiguous list, the content selection module 150 processes primitive elements in one contiguous section of the ordered list as contiguous content. In some of these embodiments, a selection of contiguous content in a document (or a contiguous selection of content in a document) can therefore be defined by a contiguous section in the ordered list. Some embodiments define the contiguous selection by the first and last primitive elements in the contiguous selection. Some embodiments identify the first and last primitive elements in the contiguous selection by a pair of indices referencing the ordered list.

In some embodiments, the content selection module 150 performs the contiguous selection by using a start selection point and an end selection point for selecting content elements in the document. In some embodiments, the start and end selection points are determined in a GUI environment. Some embodiments determine the start selection point by the location of a cursor when the selection operation starts (e.g., when the user first presses the mouse button or touches the touch screen during the selection operation) and the end selection point by the location of the cursor when the selection operation ends (e.g., when the user releases the mouse button or stops touching touch screen during the selection operation).

Figure 4:
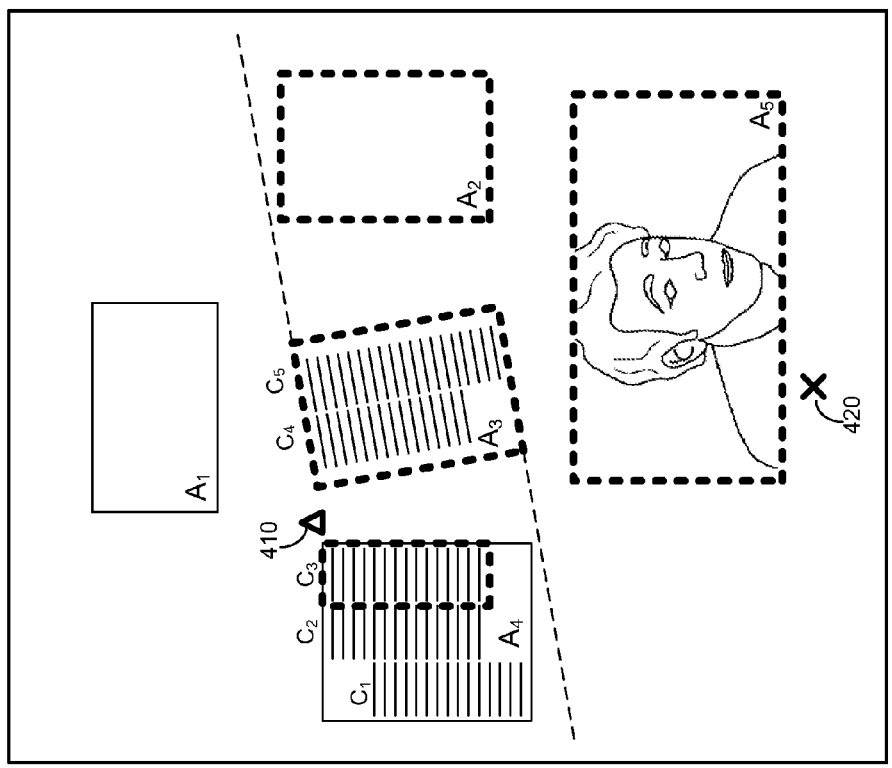
FIG. 4 illustrates an example contiguous selection on the document page of FIG. 2.

FIG. 4 illustrates an example contiguous selection on the document page 200 of FIG. 2. As mentioned above, page 200 includes the primitive areas $A_1$-$A_5$, the primitive area $A_4$ includes columns $C_1$, $C_2$ and $C_3$, and the primitive area $A_3$ includes columns $C_4$ and $C_5$. Columns $C_3$, $C_4$, $C_5$ and primitive areas, $A_3$, $A_2$ and $A_5$ are shown as highlighted to indicate that they are selected as part of a contiguous selection. FIG. 4 also illustrates a start selection point 410 (illustrated as a triangle) and an end selection point 420 (illustrated as an 'X') that are used to determine the contiguous selection. One of ordinary skill would recognize that the illustration of the start selection point and the end point selection point in FIG. 4 is for the purpose of description. Some embodiments do not display start selection point and/or end selection point. Some other embodiments display the start selection point and the end selection using other visual cues such as corners of a rectangular selection box.

Some embodiments determine the first and last primitive elements in the contiguous selection by determining which primitive elements in the page are the closest in reading order to the selection points. In the example of FIG. 4, the content selection module 150 identifies the first character glyph in column $C_3$ of the area $A_4$ as the closest primitive element in reading order to the start selection point 410 and the image in the area $A_5$ as the closest primitive element in reading order to the end selection point 420. In other words, the beginning of $C_3$ and the end of $A_5$ are identified as the first and last primitive elements in the contiguous selection. Some embodiments then use the identified first and last primitive element to identify all primitive elements and primitive areas in the contiguous selection by using the ordered list.

Figure 5:
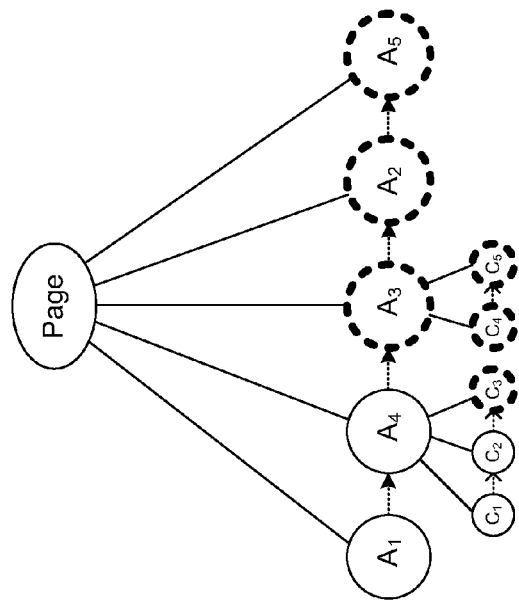
FIG. 5 conceptually illustrates a contiguous selection of primitive elements in the ordered list that is generated based on the document page of FIG. 2.

FIG. 5 conceptually illustrates a contiguous selection of primitive elements in the ordered list 300 that is generated based on the page 200. As illustrated, all nodes in the ordered list 300 between the node 343 (the node representing the column C3) and the node 350 (the representing the primitive area A5) are part of the contiguous selection (indicated by highlight of nodes representing $C_3$, $A_3$, $C_4$, $C_5$, $A_2$ and $A_5$). Content selection will be further described below in Section II.

Before further describing the invention, several terms and concepts used in some embodiments will first be introduced and explained. Some embodiments define the bounds of a content (e.g., a paragraph, a column containing one or more paragraphs, a layout containing one or more columns, etc.) on a page to be the smallest upright rectangle that contains the content. Some of these embodiments define the bounds to be "upright" when the rectangle's sides are parallel to the axis of the local coordinate system of the content. In addition, some embodiments define the start point of a layout area as the upper left corner of the bounds of its first column, and the end point as the lower right corner of the bounds of its last column. The "upper-left" and "bottom right" corners of a bound are defined based on local coordinates of the layout area. For other types of areas that are not layout areas, such as a shape, an image, or a group of shapes and images, the start point is defined by some embodiments as the upper left corner of the area's bounds in local coordinates. Likewise, the end point of these non-layout types of areas is defined by some embodiments as the lower right corner of the area's bounds in local coordinates.

Figure 6:
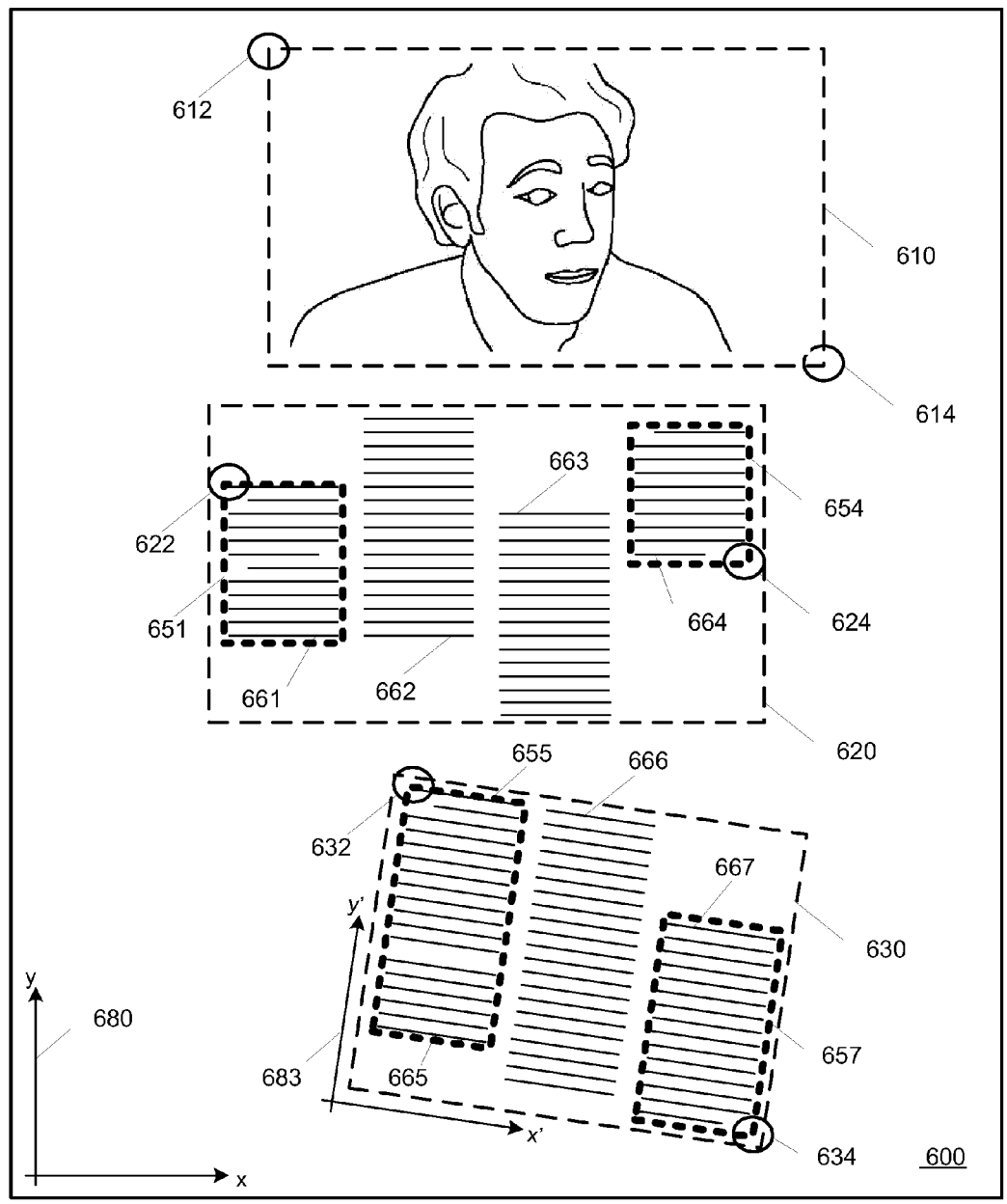
FIG. 6 illustrates examples of start points and end points for some types of areas in a page.

For some embodiments, FIG. 6 illustrates example start points and end points for some types of areas in a page. FIG.

6 illustrates a page 600 that includes areas 610, 620, and 630. The area 610 has a start point 612 and an end point 614. The area 620 has a start point 622 and an end point 624. The area 630 has a start point 632 and an end point 634.

The area 610 includes a graphical representation of a man, but does not include text. Some embodiments classify such an area as a graphical area rather than a layout area. The start point 612 of the graphical area 610 is defined at the top left corner of the graphical area, while the end point 614 of the graphical area 610 is defined at the bottom right corner of the graphical area. In some embodiments, the definition of "top", "bottom", "left", and "right" are in reference to a local coordinate system (not shown) of the graphical area 610. Since the graphical area 610 is not rotated with respect to the page, the definition of top/bottom/left/right according to the local coordinate system of the graphical area 610 will be the same as the definition of top/bottom/left/right in accordance with the coordinate system 680 of the page 600.

The area 620 includes several columns of text 661-664. Some embodiments classify such an area as a layout area. Unlike the graphical area 610, the start and end points of the layout area 620 are not defined by the upper left corner and bottom right corner of the area. Instead, the start point 622 of the layout area 620 is defined by the upper left corner of the bounds 651 of the first column 661. The end point 624 of the layout area 620 is defined by the bottom right corner of the bounds 654 of the last column 664. Since the layout area 620 is not rotated with respect to the page, the definition of top/bottom/left/right according to the local coordinate system (not shown) of the layout area 620 will be the same as the definition of top/bottom/left/right in accordance with the coordinate system 680 of the page 600.

The area 630 also includes several columns of text 665-667. Some embodiments classify the area 630 as a layout area similar to the area 620. Like the layout area 620, the start point 632 of the layout area 630 is defined by the upper left corner of the bounds 655 of the first column 665, and the end point 634 of the layout area 630 is defined by the bottom right corner of the bounds 657 of the last column 667.

However, unlike the layout area 620, the layout area 630 is rotated with respect to the page 600. The definition of top/bottom/left/right for the rotated area 630 is by reference to a rotated local coordinate system 683 of the rotated area 630, rather than the coordinate system 680 of the page 600. The definition of start point and end point are likewise based on this rotated coordinate system 683.

Some embodiments also define an interior region, a preceding region, and a following region of an area. For an area that is not a layout area, the interior region of the area is defined in some embodiments as the region that is inside the bounds of the area. For a layout area, the interior region is defined as the region inside the bounds of the layout area minus the space immediately above the bounds of first column and immediately below the bounds of the last column. (Unlike their component parts, layout area bounds are not adequately approximated by rectangles, since each column can start and end at different heights than the others, and there can be large white spaces within a layout where its content flows around obstacles such as other areas.) The preceding region of an area is the locus of points above or immediately to the left of the interior region, while the following region is the locus of points below or immediately to the right of the interior region.

Figure 7:
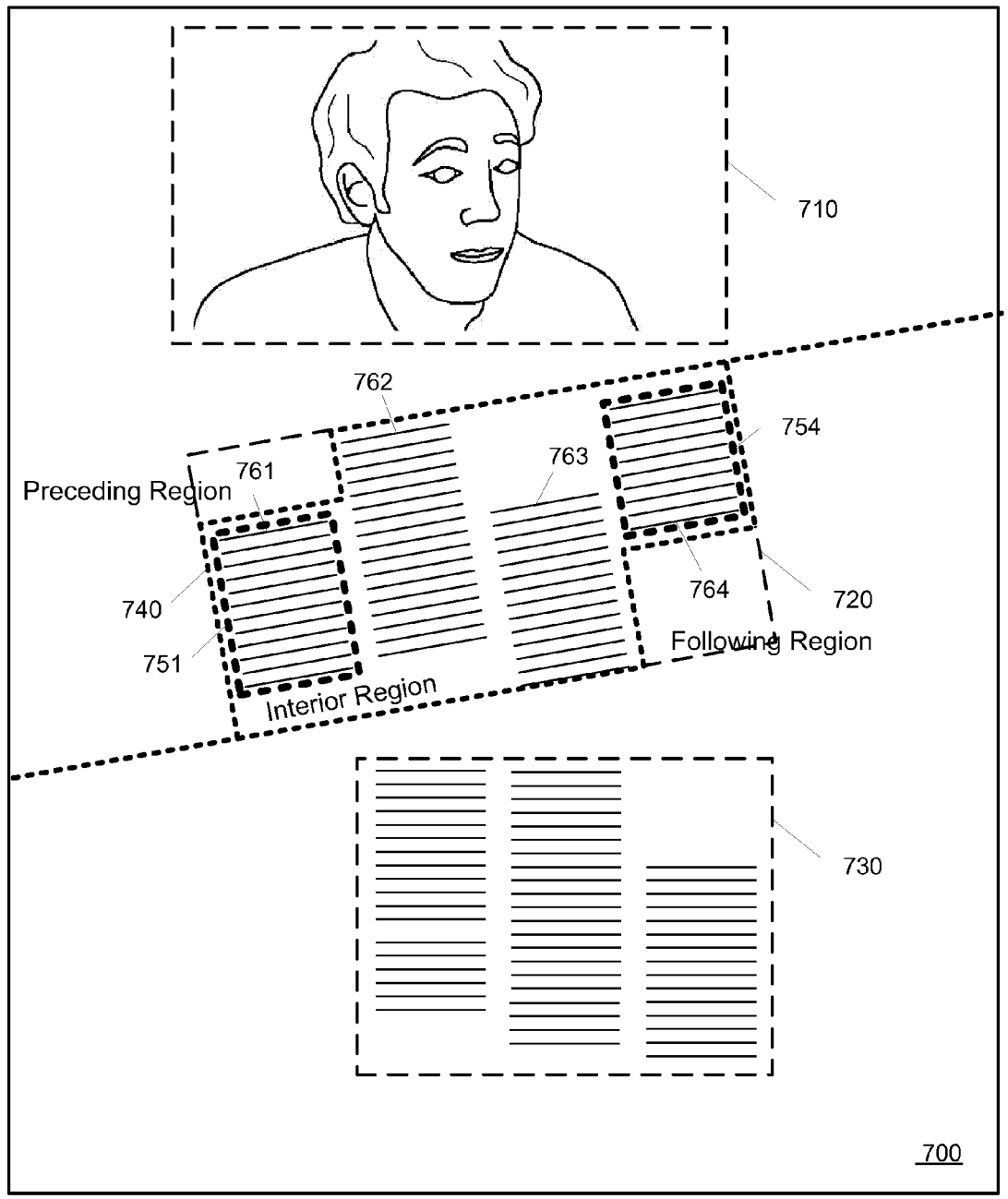
FIG. 7 illustrates examples of interior, preceding, and following areas of a layout area.

FIG. 7 illustrates examples of the interior, preceding, and following regions of a layout area 720. As illustrated, a page 700 includes a graphical area 710 and layout areas 720 and 730. The layout area 720 includes textual columns 761-764. The first column 761 has bounds 751 and the last column 764 has bounds 754. The interior region of the layout area 720 is enclosed by a dashed boundary 740, which in some embodiments is defined by the smallest upright rectangle that can contain all four columns 761-764, minus the space immediately above the bounds of first column and immediately below the bounds of the last column (thus the top-left corner and bottom right corner of the layout area 720 is not part of the interior region). The region to the left and top of the interior region is defined as the preceding region of the layout area 720, while the region to the right and bottom of the interior region is defined as the following region of the layout area 720. The graphical area 710 is thus the preceding region, while the layout area 730 is the following region of the layout area 720.

For the layout area 720, the definition of the preceding region (i.e., the region to the top and the left of the interior region) and the following region (i.e., the region to the bottom and the right of the interior region) in some embodiments references a coordinate system local to the layout area 720 for the definition of top/bottom/left/right rather than the page 700. In the example illustrated by FIG. 7, the layout area 720 is not aligned with the page 700, and thus the definition of top/bottom/left/right according to the page 700 will not necessarily agree with the definition of top/bottom/left/right according to the layout area 720. The definition of preceding and following regions under these circumstances references the definition of top/bottom/left/right of the layout area 720 rather than the page 700 in some embodiments.

More detailed examples of some embodiments will be described below. Section I describes the ordering of areas in a document page according to start point order relation and contextual order relation. Section II then describes the contiguous selection of document elements in a contiguous section of the ordered list by using a start selection point and an end selection point.

I. Content Ordering

In order to facilitate operations on content in a document (operations such as selection, searching, navigating, reflowing, copying/pasting, converting, or editing of content) across different primitive areas of the document, some embodiments first establish an ordering among the different primitive areas. Some embodiments sort the primitive areas by comparing the position of the start point of the different primitive areas (start point order relation). Some embodiments establish ordering between different primitive areas according to the reading flow within each of the primitive areas (contextual order relation). Some embodiments initially sort the primitive areas using start point order relation and then modify the sorting result using contextual order relation. An ordered list is constructed based on the modified sorting result.

A. Start Point Order Relation

In some embodiments, a given area $A_1$ is considered to be before another area $A_2$ in reading order if a person is supposed to start reading $A_1$ before reading $A_2$ (regardless of whether one would finish reading $A_1$ before reading $A_2$, which may depend on whether $A_2$ is logically contained within $A_1$). Some embodiments refer to $A_1$ and $A_2$ as having an order relation that specifies $A_1$ to be before $A_2$. An example of such an order relation is start point order relation. According to the start point order relation of some embodiments, $A_1$ and $A_2$ are ordered by their respective start points $(x_1, y_1)$ and $(x_2, y_2)$ in page coordinates. For a page coordinate system that has an x-axis that points to the right and an y-axis that points to the top of the page, start point order relation specifies that $A_1 < A_2$ (area $A_1$ is before area $A_2$) if and only if: (i) $y_1 > y_2$ or (ii) $y_1 = y_2$ and $x_1 < x_2$. In some embodiments, x-coordinates are used for determining start point ordering as long as $y_1$ and $y_2$ are sufficiently close to each other (i.e., the vertical positions of $A_1$ and $A_2$ are not noticeably different). Some of these embodiments specify $A_1 < A_2$ if and only if: (i) $y_1 - y_2 \geq \epsilon$ or (ii) $|y_1 - y_2| < \epsilon$ and $x_1 < x_2$, where $\epsilon$ is a positive threshold value. In some embodiments, $\epsilon$ is determined based on an average or a median height of the text in areas $A_1$ and/or $A_2$. (For example, if the average height of the text in $A_1$ and $A_2$ is ⅛ of an inch, then $A_1$ and $A_2$ are considered to have the same vertical position if the y-coordinates of the start points of $A_1$ and $A_2$ differ by less than ⅛ of an inch)

Figure 8:
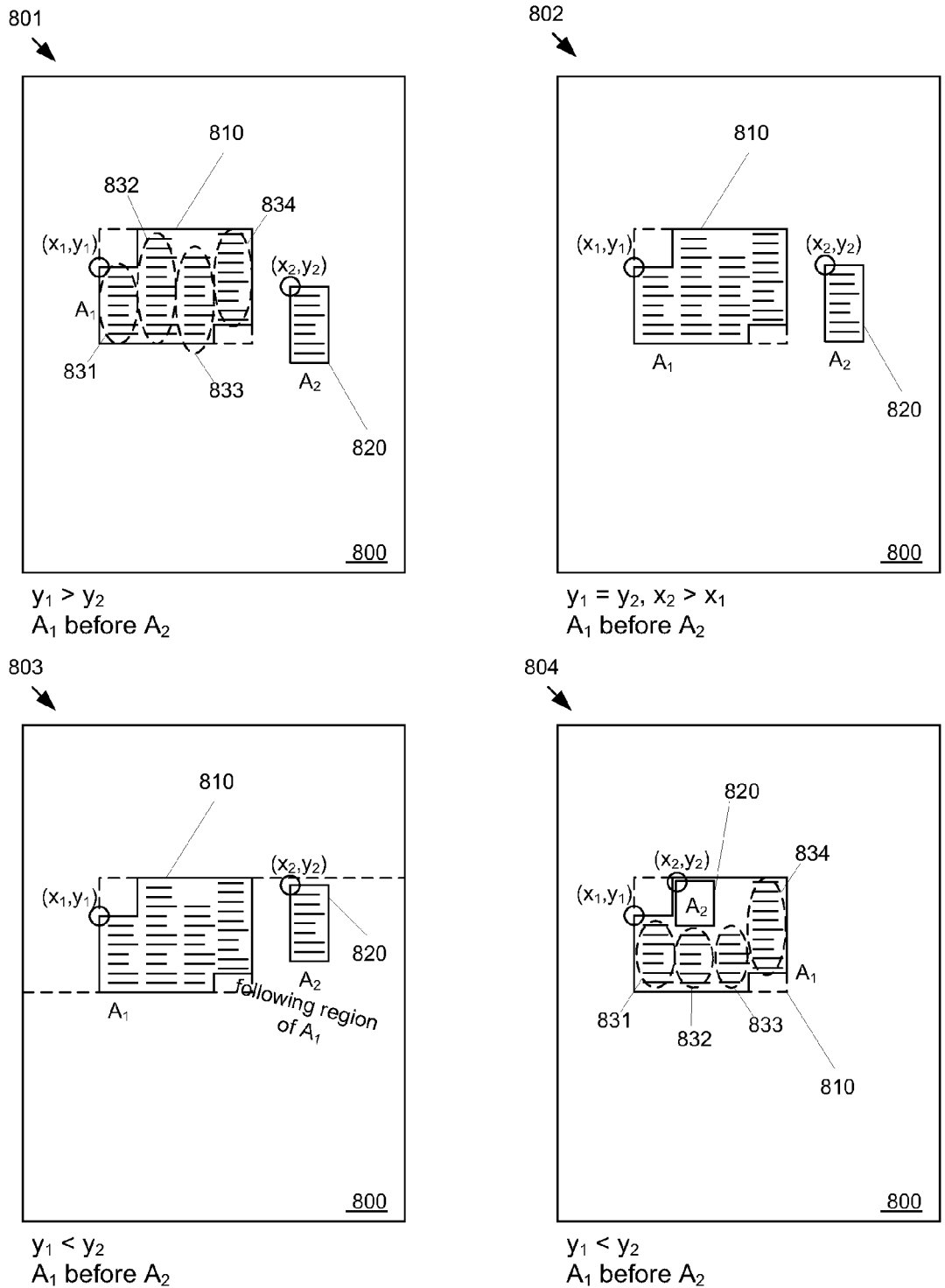
FIG. 8 illustrates an example of start point order relation in four different scenarios.

FIG. 8 illustrates examples of start point order relation in four different scenarios 801-804. Each of the four scenarios illustrates a page 800 that includes a first layout area 810, and a second layout area 820. The first layout area 810 ($A_1$) has a start point at ($x_1$, $y_1$) and the second layout area 820 ($A_2$) has a start point at ($x_2$, $y_2$). Both ($x_1$, $y_1$) and ($x_2$, $y_2$) are coordinates in a coordinate system of the page 800. The layout area 810 also includes columns 831-834.

In the first scenario 801, the start point ($x_1$, $y_1$) of area $A_1$ is above the start point ($x_2$, $y_2$) of area $A_2$ (i.e., $y_1 > y_2$). The area $A_1$ is therefore before $A_2$ ($A_1 < A_2$) according to start point order relation.

In the second scenario 802, the start point ($x_1$, $y_1$) of area $A_1$ is at the same level as the start point ($x_2$, $y_2$) of area $A_2$ (i.e., $y_1 = y_2$). Since the y-coordinates of the two areas are the same and cannot be used to determine ordering in this scenario, some embodiments use x-coordinates instead to determine the ordering between areas $A_1$ and $A_2$. Since $A_2$ is to the right of $A_1$ (i.e., $x_2 > x_1$), the area $A_1$ is before $A_2$ (denoted as $A_1 < A_2$) according to start point order relation.

In the third scenario 803, the start point ($x_1$, $y_1$) of area $A_1$ is below the start point ($x_2$, $y_2$) of area $A_2$. According to start point order relation, $A_2$ would be considered to be before $A_2$. However, since the top corner of $A_2$ is below the top border of $A_1$, a human reader would normally read $A_1$ before $A_2$. Some embodiments therefore still place $A_1$ before $A_2$ in the ordered list by disregarding the start point order relation between the two areas.

In the fourth scenario 804, the start point ($x_1$, $y_1$) of area $A_1$ is also below the start point ($x_2$, $y_2$) of area $A_2$ (i.e., $y_1 < y_2$). According to start point order relation, $A_2$ would be considered to be before $A_1$ as well. However, since $A_2$ is within the boundaries of $A_1$ (such as when $A_2$ is a "call-out" of $A_1$), a reader in this situation may read $A_1$ before $A_2$. Some embodiments thus specify $A_1$ to be before $A_2$, even though the start point of $A_1$ is below the start point of $A_2$.

Some of these embodiments in scenarios similar to 803 and 804 make the determination to disregard start point order relation by examining contextual order relation between the areas. Contextual order relation will now be described.

B. Contextual Order Relation

Start point order relation sometimes yield results that are non-intuitive and fails to mimic the order in which an actual human would read a page of a document. In the example illustrated in FIG. 8, start point order relation requires $A_2$ to be before $A_1$ in both scenarios 803 and 804, even though an actual human would read $A_1$ before $A_2$. In general, start point order relation may fail to mimic human reading order when one or more areas are positioned and/or transformed in such a way that there is an implied dependence on the flow order of the content of one or more of the areas. Some embodiments therefore establish ordering by using contextual order relation, which examines the flow order of content of the primitive areas.

Figure 9:
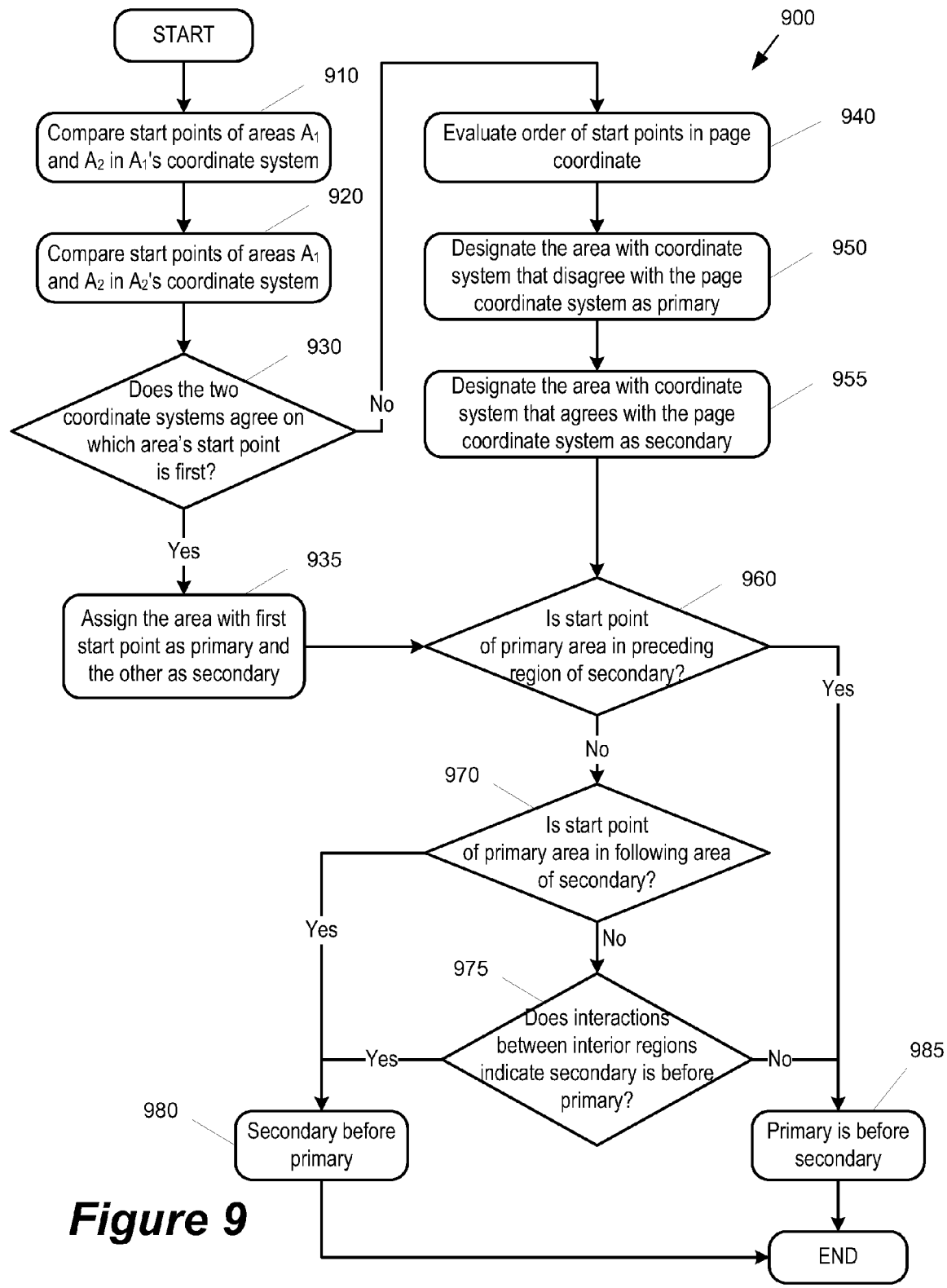
FIG. 9 conceptually illustrates a process that uses contextual order relation for determining ordering between two areas in a page.

In some embodiments, contextual order relation is used to define orderings between areas in addition to, or in place of, start point order relation. Contextual order relation in some of these embodiments is an ordering scheme that determines the ordering between two areas in a page by using local coordinate systems of each of the two areas. FIG. 9 conceptually illustrates a process 900 that uses contextual order relation for determining ordering between a first area $A_1$ and a second area $A_2$ in a page. The process 900 will be described by reference to FIG. 8.

The process 900 of FIG. 9 compares (at 910) the start points of the two areas in the first area's local coordinate system and determines an ordering. The process then compares (at 920) the start points of the two areas in the second area's local coordinate system and determines an ordering. In some embodiments, comparing the start points of the two areas under either of the local coordinate systems is similar to start point order relation comparison discussed above except that a different coordinate system is used. For instance, if the start point of the first area has a y-coordinate that is above the y-coordinate of the start point of the second area, then the first area is considered to be before the second area; and if the y-coordinates of the start points of the two areas are equal, then the process compares the x-coordinates of the start points of the two areas.

The process then determines (at 930) whether the two local coordinate systems agree on which area has the first start point. In the example scenarios 801-804 illustrated in FIG. 8 above, the local coordinate systems of $A_1$ and $A_2$ agree as to which area has the first start point since the two areas are aligned. Determination of whether two local coordinate systems agree as to which area has the first start point will be further described below by reference to FIG. 5. If the two local coordinate systems agree on the ordering of the two areas, the process proceeds to 935 and assigns the area with the first start point as the primary area, and the area with the second start point as the secondary area. On the other hand, if the two local coordinate systems disagree on the ordering of the two areas, the process proceeds to 940.

The process 900 evaluates (at 940) the order of start points in page coordinates when the two local coordinate systems disagree on the order of the two areas. Since the order in page coordinates necessarily disagrees with the order in the coordinates of one area and agrees with the order in the coordinates of the other area when the two coordinate systems disagree, the process designates (at 950) the area with the local coordinate system that disagrees with the page's coordinate system as the primary area. The process also designates (at 955) the area with the local coordinate system that agrees with the page's coordinate system as the secondary area.

After having designated the primary and secondary areas, the process 900 next determines (at 960) whether the start point of the primary area is in the preceding region of the secondary area. If so, the process reports (at 985) that the primary area is before the secondary area. If not, the process proceeds to 970. FIG. 7 below illustrates an example of a start point of the primary area in the preceding region of the secondary area.

The process determines (at 970) whether the start point of the primary area is in the following region of the secondary area. If so, the process reports (at 980) that the secondary area is before the primary. If not, the process proceeds to 975. In the example scenario 803 illustrated in FIG. 8 above, $A_2$ is the primary area P and $A_1$ is the secondary area S since the start point of $A_2$ is before the start point of $A_1$ ($y_2 > y_1$). However, since $A_2$ as the primary area is in the following region of the secondary area $A_1$, $A_1$ would be reported as to be before $A_2$ under contextual order relation. FIG. 6 below illustrates an example of when the start point of the primary area is in the following region of the secondary area.

The process determines (at 975) whether the interactions between the interior regions of the primary area P and secondary area S indicate that the secondary area S is before the primary area P. When the start point of P is in the interior region of S, some embodiments make this determination based on whether the interior region of P lies entirely above all columns of S that have overlapping horizontal extent in the coordinates of S and if there is more than one such column. If so, the process reports (at 985) that the primary area is before the secondary. If not, the process reports (at 980) that the secondary area is before the primary. After reporting the ordering between the primary and secondary areas, the process 900 ends.

In the example scenario 804 illustrated in FIG. 8 above, $A_2$ has the first start point (because $y_1 < y_2$) and is thus assigned as the primary area P. $A_1$ is thus assigned as the secondary area S. The start point of P ($A_2$) is within the interior region of S ($A_1$), but S ($A_1$) has only one column that has overlapping horizontal extent with P ($A_2$) that is entirely below P ($A_2$), (the column 832 is the only column of S ($A_1$) that has overlapping horizontal extent with P ($A_2$) that is entirely below P ($A_2$); the columns 831, 833, and 834 of $A_1$ do not have overlapping horizontal extent with $A_2$). Therefore, P is not before S, hence $A_1$ is before $A_2$. (On the other hand, if $A_2$ is wide enough to also overlap horizontally with the column 833, P would have been entirely above all columns of S that have overlapping horizontal extent in the coordinate system of S and that there are more than one such columns.) Determination of the ordering based on the interactions between the interior regions of the primary area P and the secondary area S will be further described below by reference to FIG. 8.

Figure 10:
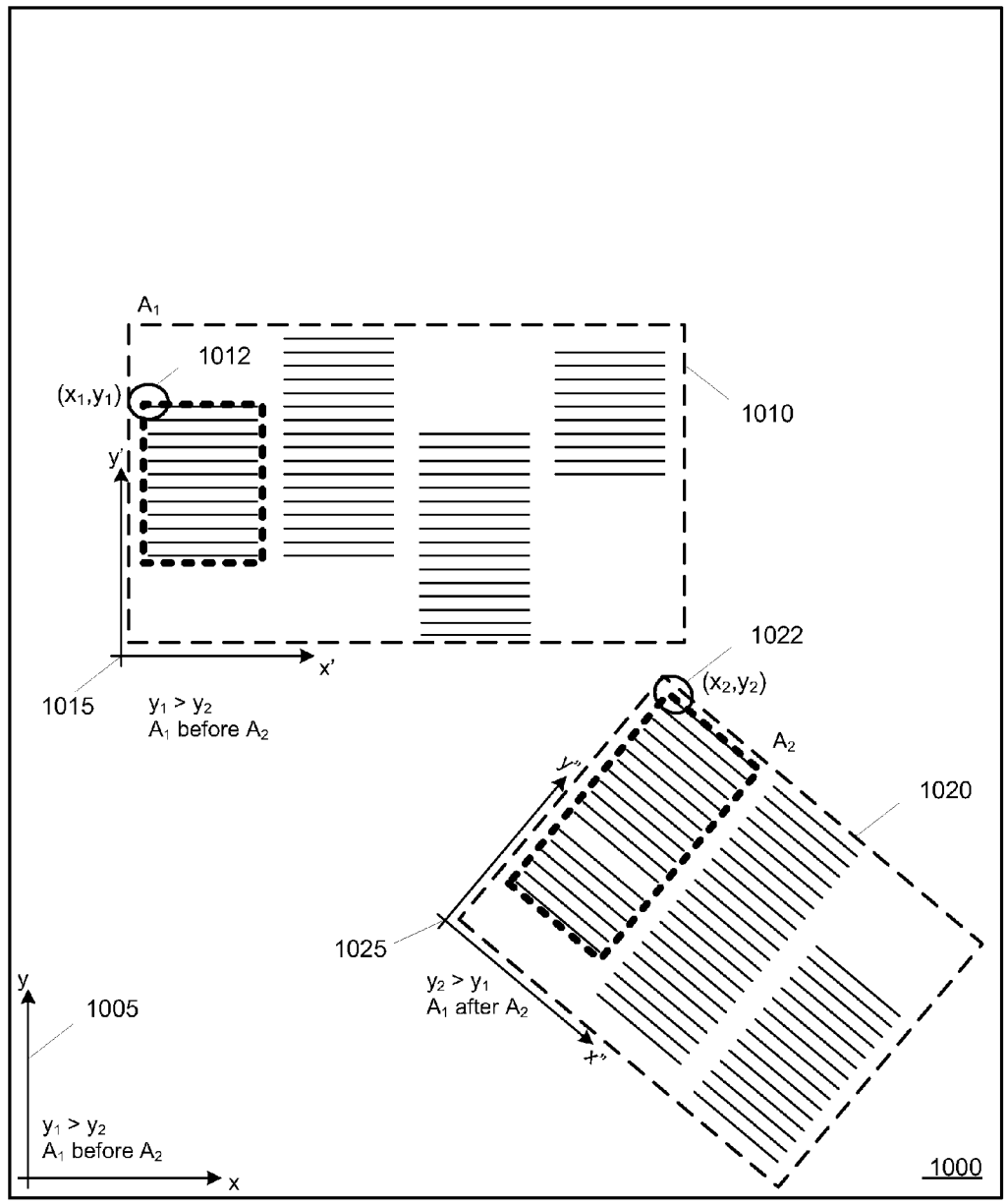
FIG. 10 illustrates a page that includes an area that is aligned with the coordinate system of the page and another area that is not aligned with the coordinate system of the page.

Contextual order relation will be further described below by reference to FIGS. 10-13. FIG. 10 illustrates an example of determining whether the two coordinate systems agree on which area has the first start point (as performed by the process 900 at 930). FIG. 10 illustrates a page 1000 with two areas 1010 and 1020. The area 1010 is aligned with the page 1000. The local coordinate system 1015 of the area 1010 is aligned with the coordinate system 1005 of the page 1000. The area 1020 is not aligned with the page 1000. Its local coordinate system 1025 is at a rotated angle from the coordinate system 1005 of the page 1000.

Under the local coordinate system 1015 (x'–y') of the area 1010 ($A_1$), the start point ($x_1$, $y_1$) of $A_1$ is above the start point ($x_2$, $y_2$) of $A_2$ (i.e., $y_1 > y_2$). In contrast, under the local coordinate system 1025 (x"–y") of the area 1020 ($A_2$), the start point ($x_1$, $y_1$) of $A_1$ is "below" the start point ($x_2$, $y_2$) of $A_2$. In other words, $A_1$ has the first start point under the local coordinate system of $A_1$, while $A_2$ has the first start point under the local coordinate system of $A_2$. The two coordinate systems of the two areas therefore do not agree on which area has the first start point.

Under the coordinate system 1005 (x, y) of the page 1000, the start point ($x_1$, $y_1$) of $A_1$ is above the start point ($x_2$, $y_2$) of $A_2$ ($y_1 > y_2$). The coordinate system of the page thus agrees with the local coordinate system of $A_1$ but disagrees with the local coordinate system of $A_2$. The process 900 at 930 would thus assign $A_1$ as the secondary area and $A_2$ as the primary area.

Figure 11:
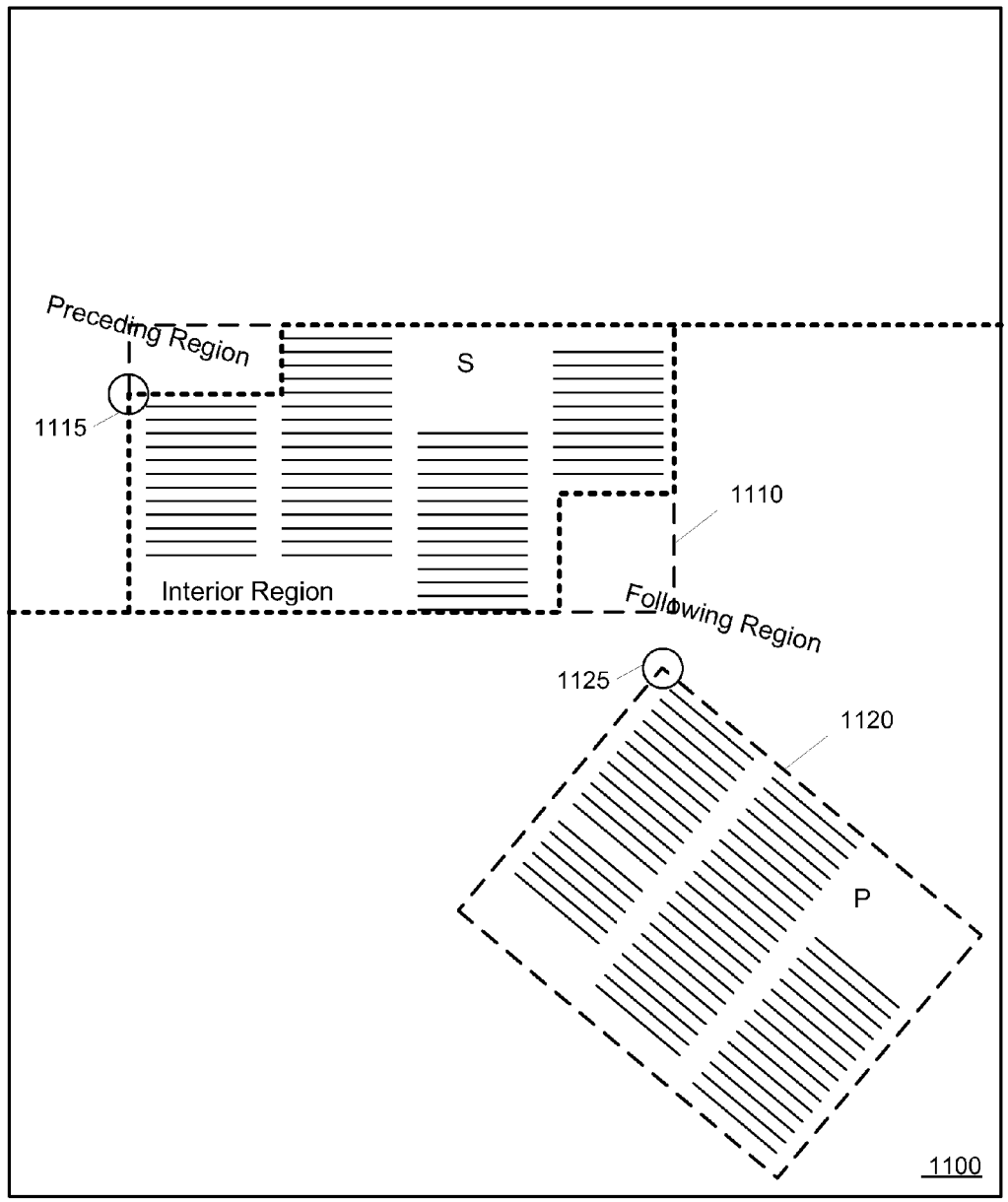
FIGS. 11-13 illustrate the determination of ordering between the primary area and the secondary area as performed by the process illustrated in FIG. 9.
Figure 12:
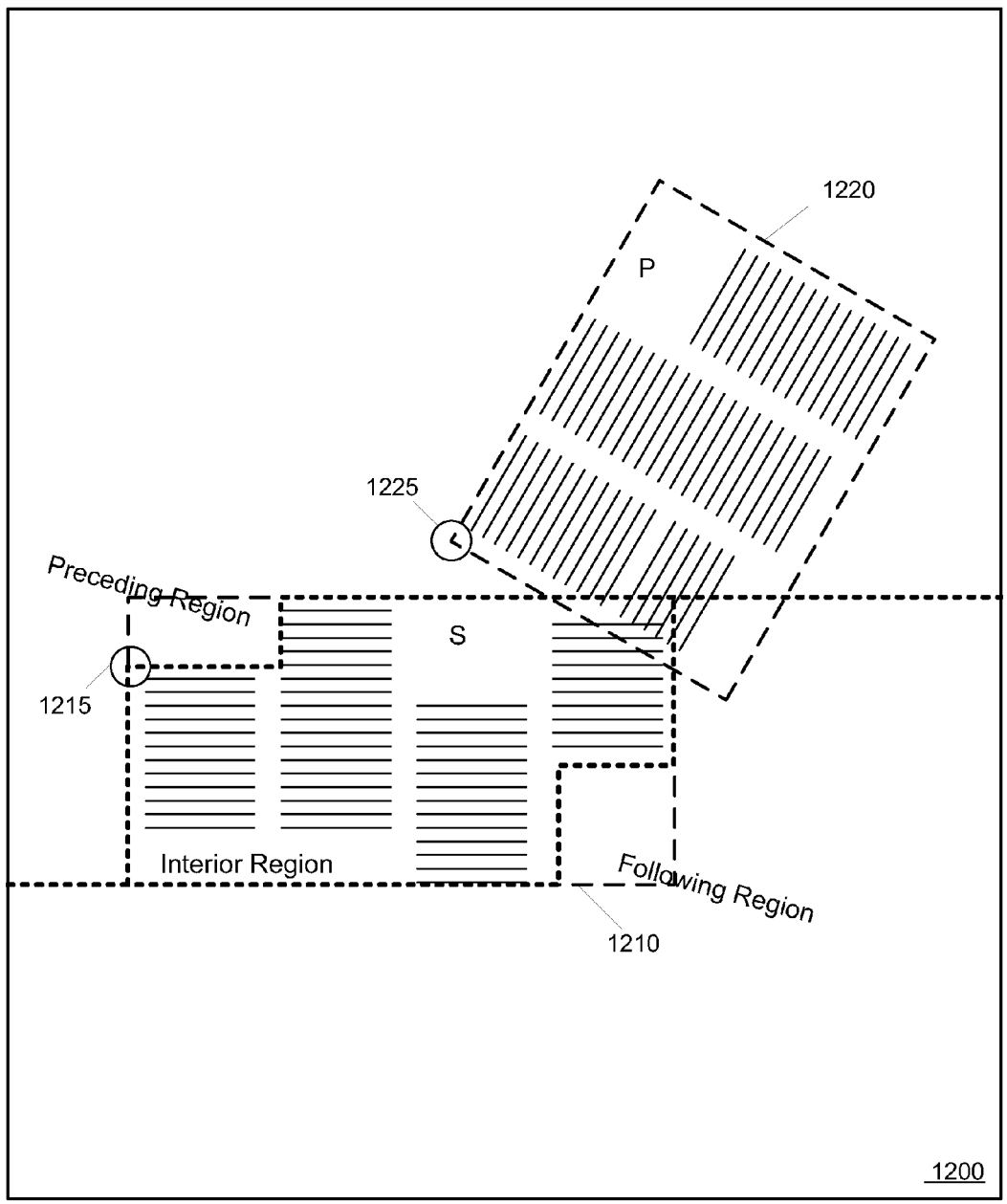
Figure 13:
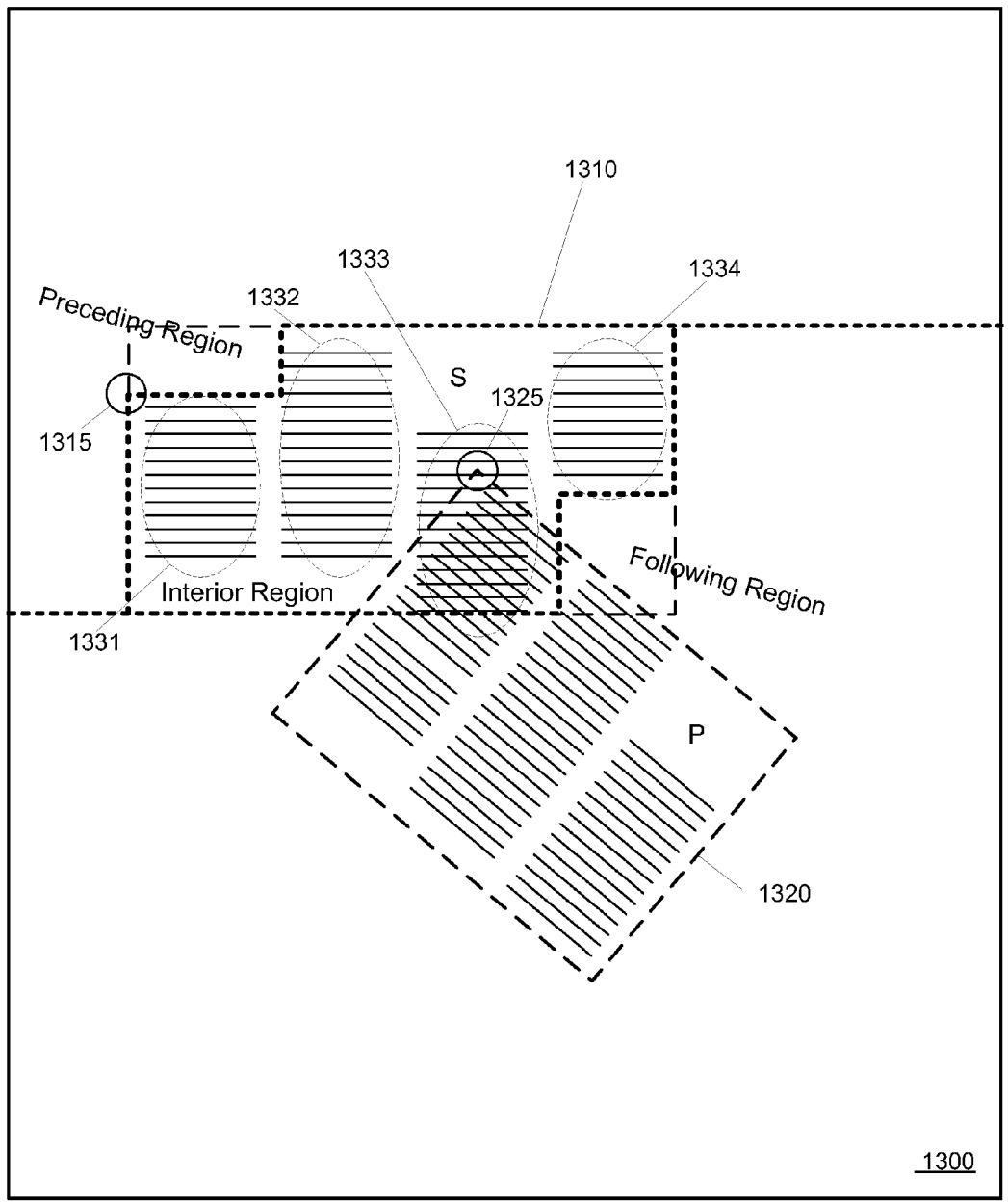

FIG. 11-13 illustrate the determination of ordering under contextual order relations between the primary area and the secondary area as performed by the process 900 at 960-985. Similar to FIG. 10, each of FIGS. 11-13 illustrates two primitive areas. And similar to FIG. 10, one of the primitive areas is rotated at an angle with respect to the page such that the two primitive areas have local coordinate systems that do not agree on which primitive area has the first start point. The rotated area is assigned to be the primary area P in these examples since it has a local coordinate system that disagrees with the page's coordinate system. The area that is aligned with the page is assigned to be the secondary area S.

In FIGS. 11-13, the position of the start point of the primary area P is assessed by referencing the regions of the secondary region S. If the start point of P is in the preceding region of S, then P<S (i.e., the primary area is before the secondary area). If the start point of P is in the following region of S, then S<P (i.e., the secondary area is before the primary area). If the start point of P is in the interior region of S, then the result depends on the precise interaction between the two interiors: if the interior region of P lies entirely above all columns of S that have overlapping horizontal extent in the coordinates of S and if there is more than one such column, then P<S; otherwise S<P.

FIG. 11 illustrates an example contextual order relation for a page that has a primary area P with a start point in the following region of a secondary area S. FIG. 11 illustrates an example page 1100 that includes layout areas 1110 and 1120. The layout area 1110 has a start point 1115 and the layout area 1120 has a start point 1125. Under the coordinate system of the page 1100, the start point 1115 of the layout area 1110 is the first start point rather than the start point 1125 of the layout area 1120, because the start point 1115 is above the start point 1125. Under the local coordinate system of the layout area 1110, the start point 1115 is the first start point. Under the local coordinate system of the layout area 1120, the start point 1125 is the first start point. The coordinate system page 1100 thus agrees with that of the layout area 1110 and disagrees with that of the layout area 1120 as to which of the two start points is the first start point. Some embodiments thus designate the layout area 1120 as the primary area P and the layout area 1110 as the secondary layout area S. Since the primary area P is the layout area 1120 that has its start point 1125 in the following region of the secondary area S (i.e., the layout area 1110), the primary area P (i.e., the layout area 1120) will be after the secondary area S under contextual order relation.

FIG. 12 illustrates an example contextual order relation for a page that has a primary area P with a start point in the preceding region of a secondary area S. FIG. 12 illustrates an example page 1200 that includes layout areas 1210 and 1220. The layout area 1210 has a start point 1215 and the layout area 1220 has a start point 1225. Under the coordinate system of the page 1200, the start point 1225 of the layout area 1220 is the first start point rather than the start point 1215 of the layout area 1210, because the start point 1225 is above the start point 1215. Under the local coordinate system of the layout area 1210, the start point 1225 is the first start point. Under the coordinate system of the layout area 1220, the start point 1215 is the first start point. The coordinate system of the page 1200 thus agrees with that of the layout area 1210 and disagrees with that of the layout area 1220 as to which of the two start points is the first start point. Some embodiments thus designate the layout area 1220 as the primary area P and the layout area 1210 as the secondary layout area S. Since the primary area P is the layout area 1220 that has its start point 1225 in the preceding region of the secondary area S (i.e., the layout area 1210), the primary area P (i.e., the layout area 1220) will be before the secondary area S under contextual order relation.

FIG. 13 illustrates an example contextual order relation for a page that has a primary area P with a start point in the interior region of the secondary area S. FIG. 13 illustrates an example page 1300 that includes layout areas 1310 and 1320. The layout area 1310 has a start point 1315 and the layout area 1320 has a start point 1325. The layout area 1310 also includes columns 1331-1334. Under the coordinate system of the page 1300, the start point 1315 of the layout area 1310 is the first start point rather than the start point 1325 of the layout area 1320, because the start point 1315 is above the start point 1325. Under the local coordinate system of the layout area 1310, the start point 1315 is the first start point. Under the local coordinate system of the layout area 1320, the start point 1325 is the first start point. The coordinate system page 1300 thus agrees with that of the layout area 1310 and disagrees with that of the layout area 1320 as to which of the two start points is the first start point. Some embodiments thus designate the layout area 1320 as the primary area P and the layout area 1310 as the secondary layout area S.

Since the primary area P is the layout area 1320 that has its start point 1325 in the interior region of the secondary area S (i.e., the layout area 1310), the ordering between P and S according to contextual order relation will be based on the interaction between the two interior regions. Some embodiments make this determination based on whether the interior region of P lies entirely above all columns of S that have overlapping horizontal extent in the coordinates of S and if there is more than one such column. If so, P is before S. If not, S is before P.

In the example illustrated in FIG. 13, the start point of P is within the interior region of S, but S has no column that has overlapping horizontal extent with P that is entirely below P. (The columns 1332-1334 of S have overlapping horizontal extent with P, but none of them are entirely below the interior region of P in the coordinate system of S.) Therefore P is not before S according to contextual relations.

In some embodiments, the contextual order relation as discussed above by reference to FIGS. 9-13 is not used on its own to order all areas on a page because it is possible to create sets of areas on which the contextual order relation is not transitive, and thus cannot be used to order those sets of areas. Some embodiments, however, do use the contextual order relation on "neighboring" areas, since contextual order relation assess the manner in which the reading flow within an area affects the perceived reading flow of neighboring areas. Some embodiments thus use start point order relation as an initial ordering (which also establishes initial neighboring pairs), and then converge on a better ordering by a succession of transpositions of neighboring pairs where indicated by the contextual order relation as long as the indicated transpositions are consistent and unambiguous.

Figure 14:
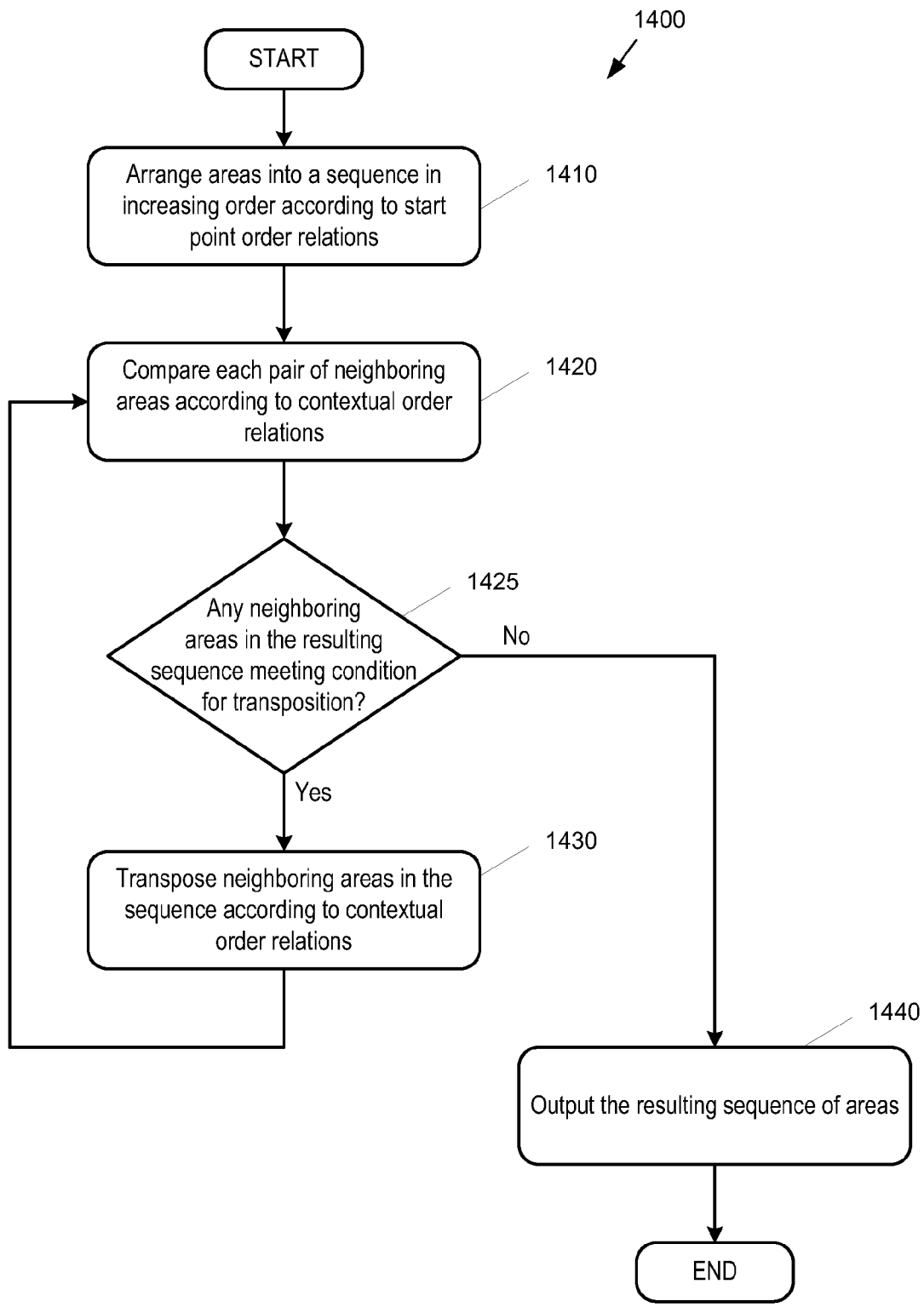
FIG. 14 conceptually illustrates an example process for using start point order relation and contextual order relation for ordering multiple areas on a page.

FIG. 14 conceptually illustrates an example process 1400 for using start point order relation and contextual order relation for ordering multiple areas on a page. The process 1400 starts when it receives a set of primitive areas in a page, which can be layout areas and graphic areas (shapes, images, and groups of shapes and images) in the page.

The process 1400 arranges (at 1410) the areas in increasing order according to the start point order relation in the coordinate system of the page, leading to a sequence of areas $A_1, A_2, \ldots, A_N$. A standard algorithm such as QuickSort can be used to sort the sequence of areas according to start point order relation.

The process compares (at 1420) pairs of neighboring areas in the sequence according to contextual order relation. Specifically, if the area $A_K$ is the first area in the sequence for which the contextual order relation is $A_K < A_{K-1}$, then $A_K$, with its predecessor in the sequence $A_{K-1}$, will need to be transposed (i.e., $A_{K-1}, A_K \rightarrow A_K, A_{K-1}$). In some embodiments, for an $A_K$ that has corresponding subsequent area $A_{K+1}$ in the sequence, the transposition between $A_K$ and $A_{K-1}$ will take place only if $A_K < A_{K+1}$. Some embodiments add this condition in order to ensure that transpositions only occur when it is unambiguous which neighbor to transpose, because if $A_K < A_{K-1}$ and $A_K > A_{K+1}$ then it is ambiguous whether transposition should take place between $A_K$ and $A_{K-1}$ or $A_K$ and $A_{K+1}$.

The process 1400 next determines (at 1425) whether any pair of neighboring pairs of areas needs to be transposed according to the comparison performed at 1420. If there is at least one neighboring pair that needs to be transposed, the process proceeds to 1430. If no neighboring pairs of areas need to be transposed under contextual order relations, the process proceeds to 1440.

The process transposes (at 1430) neighboring areas in the sequence of areas according to the contextual order relation between these neighboring areas. After finishing transposing neighboring areas in the sequence according to contextual order relations, the process 1400 returns to 1420 to once again compare each pair of neighboring areas according to contextual order relations. This is necessary in some embodiments because the transpositions performed at operation 1430 create new neighboring pairs of areas that have not been compared under contextual order relation. The process 1400 is thus an iterative process that repeats until the entire sequence of areas satisfies contextual order relations. It can be proven that this iterative process will always complete. This establishes a linear ordering of all primitive areas on the page using both start point order relation and contextual order relation.

At 1440, the process 1400 outputs the resulting sequence of areas. Some embodiments assign an order index to each of the areas according to the resulting sequence, where each order index expresses a position in the sequence. Some embodiments also use the resulting sequence to construct an ordered list of the primitive areas. After outputting the resulting sequence of areas, the process 1400 ends.

Figure 15:
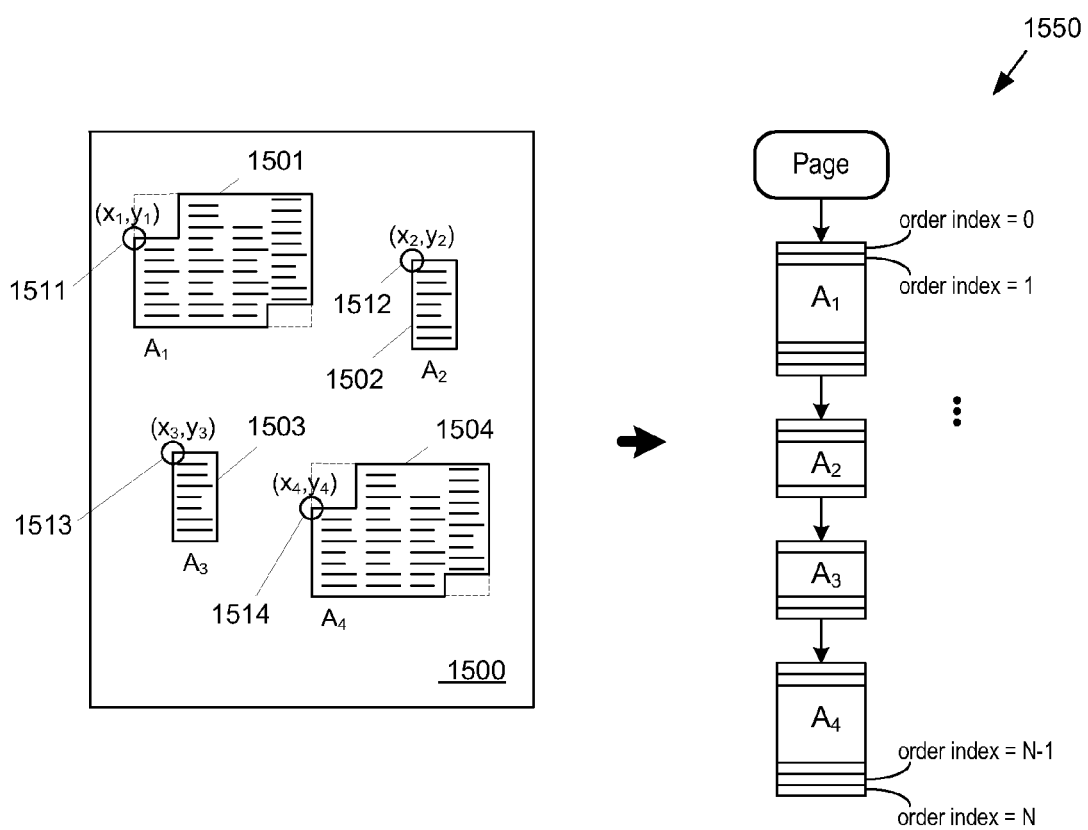
FIG. 15 illustrates an example page and an example ordered list that corresponds to the example page.

FIG. 15 illustrates an ordered list 1550 that is constructed from primitive areas in an example page 1500. The page 1500 includes layout areas $A_1$ (1501), $A_2$ (1502), $A_3$ (1503), and $A_4$ (1504). The area 1501 has a start point 1511 at $(x_1, y_1)$, the area 1502 has a start point 1512 at $(x_2, y_2)$, the area 1503 has a start point 1513 at $(x_3, y_3)$, and the area 1504 has a start point 1514 at $(x_4, y_4)$.

The ordered list 1550 is a represented by an array that expresses the ordering of the areas $A_1$-$A_4$ of the page 1500. The ordered list 1550 can also be represented by a tree structure, or any other data object modeling construct that can represent the sequential relationship between $A_1$-$A_4$. Since $y_1 > y_2 > y_3 > y_4$ and none of the areas $A_1$-$A_4$ is positioned or transformed in such a way that causes start point order relation to differ from contextual order relation, the process 900 would produce an ordering 1550 of the areas $A_1$-$A_4$ based on the ascending order $A_1 \rightarrow A_2 \rightarrow A_3 \rightarrow A_4$.

In some embodiments, an order index is assigned to each primitive element of each primitive area. The order index assigned to each primitive element is based on the ordering of the primitive area to which the primitive element belongs. In the example of FIG. 15, the ordering between the primitive areas $A_1$-$A_4$ determines the ordering of primitive elements between the different primitive areas. For example, the primitive elements in $A_1$ are given order indices ahead of primitive elements in $A_2$, and primitive elements in $A_2$ are given order indices before primitive elements in $A_3$, etc.

Within each primitive area, the reading flow established by hierarchical structures within the primitive area determines the order indices assigned to the primitive elements. For example, a layout area that includes character glyphs and inline graphics as primitive elements can have an order index assigned to each of the glyphs and inline graphics according to the reading flow established by the text lines, paragraphs, and columns in the layout area.

In some embodiments, the primitive areas are further grouped into sections or nested sections of the page (for example, as indicated by visible dividers or by recognizing multi-page header/footer templates). Some of these embodiments use a tree structure to model a page. The tree structure starts with the page as the root and has sections and/or primitive areas as children. The sections may have further subsections and/or other primitive area as children in turn. Each section is given the index of its first descendant area. Some embodiments then recalculate the ordering of areas to enforce section grouping by using the order indices on the tree nodes to arrange each set of siblings in increasing order. This yields an ordered tree. To get the new ordered sequence of primitive areas, some embodiments start at the root and recursively replace each section with its ordered sequence of children until only primitive areas remain. The ordering of all primitive areas on a page may be changed in this way because two sections might consist of interleaved primitive areas in the original ordering.

Figure 16:
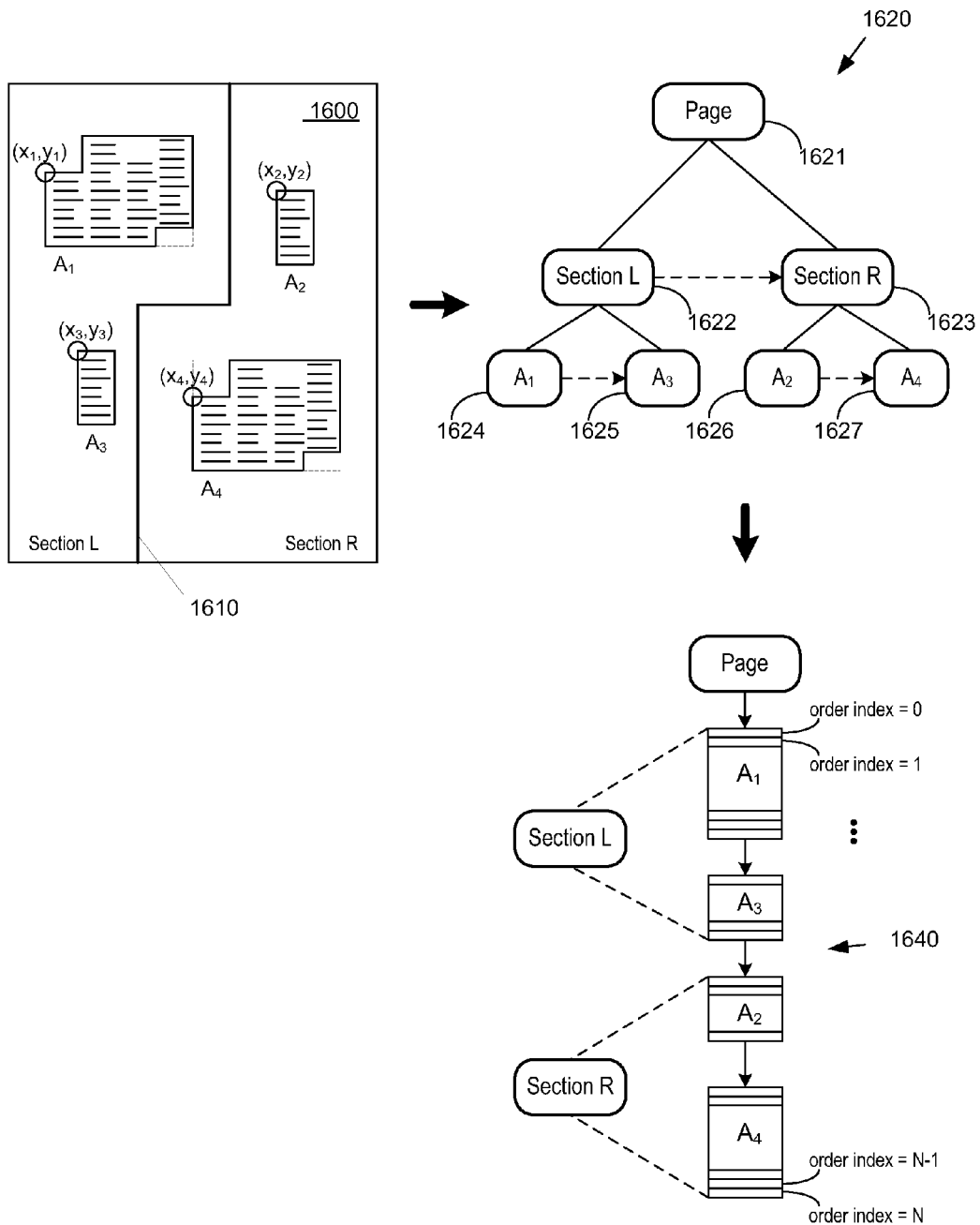
FIG. 16 illustrates the creation of an ordered list from a page having two sections.

FIG. 16 illustrates the creation of an ordered list from a page having two sections. An example page 1600 includes layout areas $A_1$, $A_2$, $A_3$, and $A_4$ such that $A_1 < A_2 < A_3 < A_4$ according to start order relation and context order relation. Unlike the page 1500, however, the page 1600 includes a visible divider 1610 that divides the page into Section L (left) and Section R (right). Section L includes the areas $A_1$ and $A_3$, while Section R includes the areas $A_2$ and $A_4$.

FIG. 16 also illustrates a tree structure 1620 that is used to model the page 1600 and the effects of the visible divider in the page 1600. The tree structure 1620 is a model of the page 1600 that starts with the page as a root node 1621. The root node 1621 has two child nodes 1622 and 1623 that represent the two sections of the page 1600. The child node 1622 represents the section L and the child node 1623 represents the section R. The child node 1622 (representing section L) has two grandchild nodes 1624 and 1625 to represent the two primitive areas $A_1$ and $A_3$ that are within section L. Likewise, the child node 1623 (representing section R) has two grandchild nodes 1626 and 1627 to represent the two primitive areas $A_2$ and $A_4$ that are within section R.

Some embodiments determine the ordering of areas within each section by determining an order of areas between the different sections. In the example of FIG. 16, the ordering of areas within section L and section R can be determined based on an ordering between $A_1$-$A_4$. The ordering between $A_1$-$A_4$ can be determined by either start point order relation or contextual order relation to be $A_1 < A_2 < A_3 < A_4$. The ordering of areas within section L is therefore $A_1 < A_3$, and the ordering of areas within section R is therefore $A_2 < A_4$. This ordering is illustrated by the dashed arrow from the node 1624 to the node 1625 and from the node 1626 to the node 1627.

Based on the ordering of all areas in the page and the ordering of areas within each section, the ordering between the different sections can be determined. In the example of FIG. 16, some embodiments determines that section L is before section R, because section L's first area ($A_1$) is before section R's first area ($A_2$). This ordering is illustrated by the dashed arrow extended from the node 1622 to the node 1623.

Based on the ordering between Sections L and R and the ordering of areas within Sections L and R, an ordered list 1640 is created (represented by an array). The newly created ordered list 1640 is in the order of $A_1 \rightarrow A_3 \rightarrow A_2 \rightarrow A_4$, reflecting the grouping of primitive areas imposed by the visible divider 1610. This is in contrast with the ordered list 1550 of FIG. 15 ($A_1 \rightarrow A_2 \rightarrow A_3 \rightarrow A_4$), which is created from a page 1500 similar to the page 1600, but one without the visible divider present in the page 1600. In some embodiments, order indices are assigned to different elements of each area in the ordered list such that the first element of the first area ($A_1$) is assigned the first index (e.g., 0) and the last element of the last area ($A_4$) is assigned the last index (e.g., N).

II. Content Selection

Since characters and inline graphics are already implicitly ordered within layout areas, the above ordering of primitive areas leads to a reading order for all characters and graphics on the page. Contiguous selections on a page can thus be defined by the first and last primitive elements in the selection, or by a pair of indices representing the start and end positions in this reading order. In some embodiments, common user interfaces for designating selections involve the user pointing to a pair of positions on the page. The corresponding indices in reading order are then deduced from the position coordinates.

Figure 17:
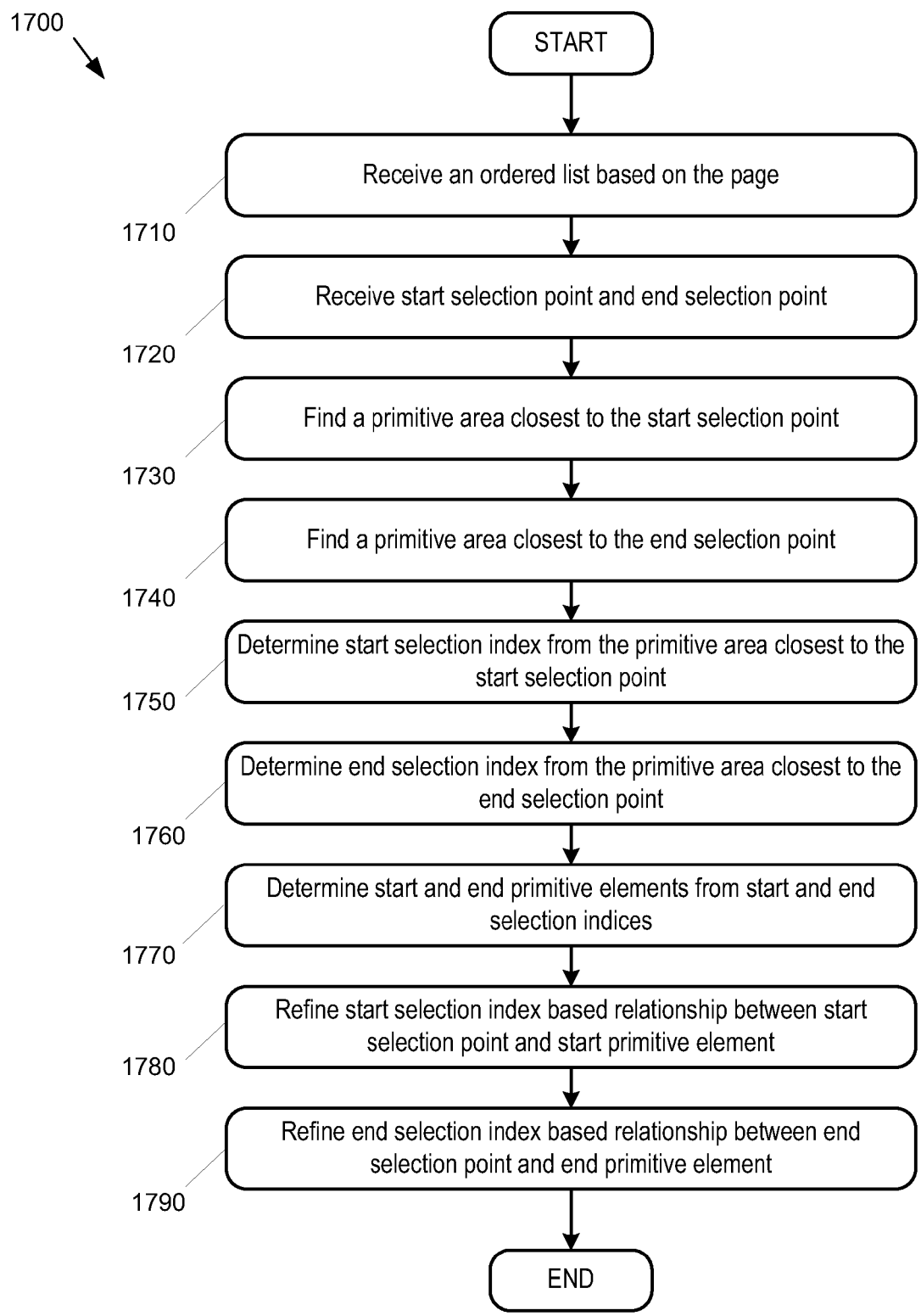
FIG. 17 conceptually illustrates a process for performing a contiguous selection on a page using a start selection point and an end selection point.

For some embodiments, FIG. 17 conceptually illustrates a process 1700 for performing a contiguous selection of document content using a start selection point and an end selection point. The process 1700 will be described by reference to FIG. 18, which illustrates a contiguous selection on a document page 1800 and on an ordered list 1850 that is generated from the content of the page 1800. The page 1800 includes areas 1801-1806 ($A_1$-$A_6$), a start selection point 1810 and an end selection point 1820. The start selection point 1810 and the end selection point 1820 define a contiguous selection 1830 that includes areas $A_3$-$A_5$. The contiguous selection 1830 starts at element 1832 of the area $A_3$ and ends at element 1834 of the area $A_5$. The dashed rectangle is only used to conceptually illustrate that part of $A_3$-$A_5$ are included in the contiguous selection 1830 in FIG. 18 rather than being part of the user interface (although some embodiments do display an indication of a user's selection).

Figure 18:
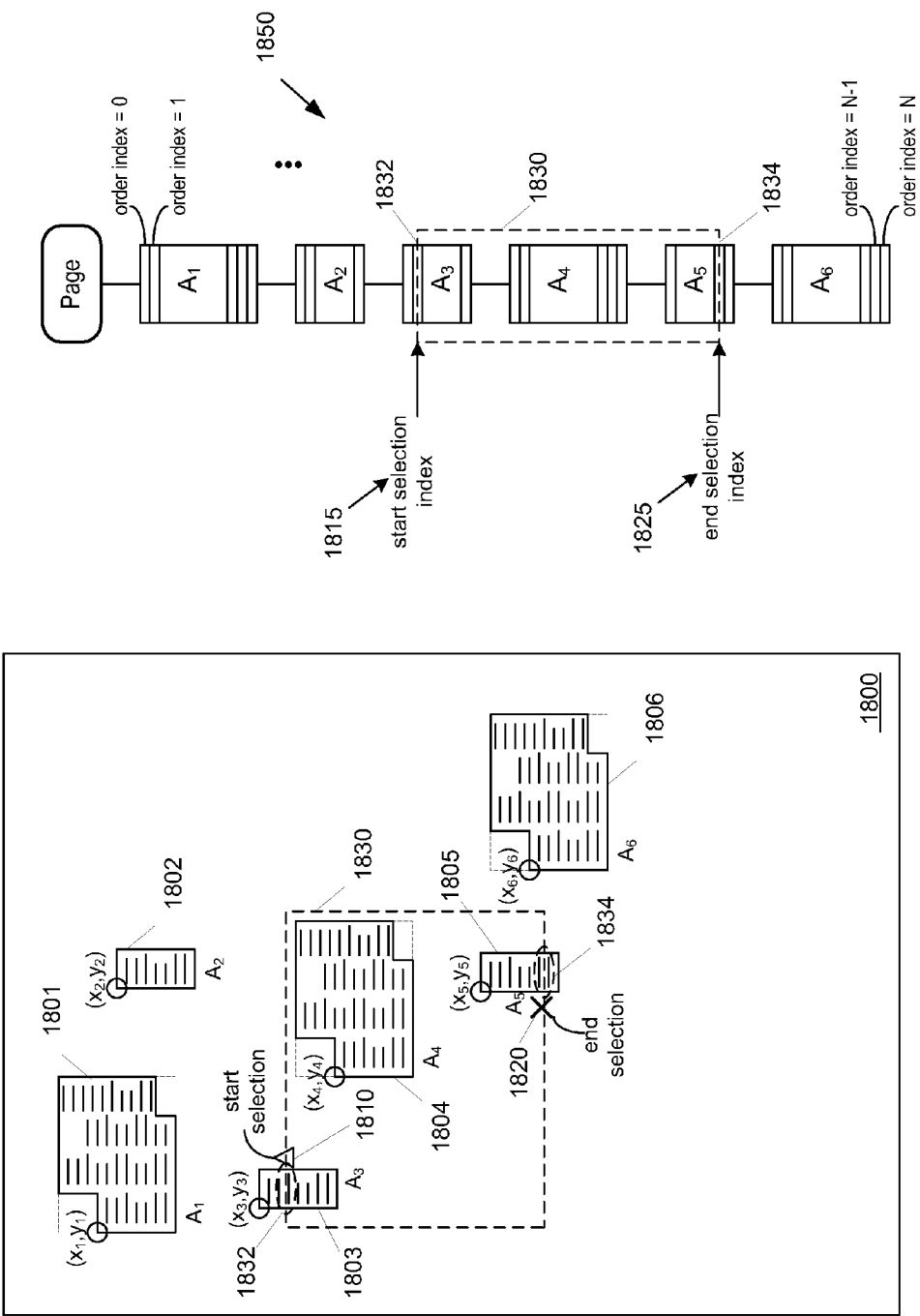
FIG. 18 illustrates a contiguous selection on a page using a start selection point and an end selection point.

The process 1700 receives (at 1710) an ordered list of document content. In the example of FIG. 18, the ordered list 1850 is based on the ordering of areas in the page 1800, which can be established by using start point order relation, contextual order relation, and/or other types of ordering schemes. The ordered list 1850 is in the sequence of $A_1 \rightarrow A_2 \rightarrow A_3 \rightarrow A_4 \rightarrow A_5 \rightarrow A_6$, reflecting the established ordering between the six areas. Each of the areas can include primitive elements (i.e., character glyphs or inline graphics), and an order index is assigned to each of the primitive elements of each of the areas in the sequence.

Next, the process 1700 receives (at 1720) a start selection point and an end selection point. The selection points are positions on a page specified by the user for performing a contiguous selection of primitive elements in the ordered list. Some embodiments derive the selection points by interpreting position indications from a user interface (e.g., a cursor or a point of contact on a touch screen). In the example of FIG. 18, the start and end selection points define the contiguous selection 1830 that starts near $A_3$ and ends near $A_5$.

The process 1700 finds (at 1730) a primitive area that is the "closest" to the start selection point. The process also finds (at 1740) a primitive area that is the "closest" to the end selection point. Throughout this document, the term "closest primitive area to a selection point" means a primitive area that is closest to a selection point in reading order. A primitive area that is the closest to a selection point in reading order is a primitive area that a reader of the document has most likely intended as the area to be selected by the selection point, which may or may not be the primitive area that is the closest by distance to the selection point. In the example of FIG. 18, the start selection point 1810 is closest to the primitive area 1803 ($A_3$) and the end selection point 1820 is closest to the area 1805 ($A_5$). Examples of finding the closest primitive area to a selection point will be described further in Sub-Section A below.

Next, the process determines (at 1750) a start selection index from the primitive area closest to the start selection point. The process also determines (at 1760) an end selection index from the primitive area closest to the end selection point. The determination of the start and end selection indices will be described further in Sub-Section B below.

The process next determines (at 1770) start and end primitive elements from the start and end selection indices. In some embodiments, the start primitive element is the primitive element assigned the start selection index in the ordered list, and the end primitive element is the primitive element assigned the end selection index in the ordered list. If the end primitive element is actually before the start primitive element in reading order, some embodiments swap the designation of "start" and "end", such that the start selection point and the start primitive element become the end selection point and the end primitive element, and vice versa.

The process refines (at 1780) start selection index based on the relationship between the start selection point and the start primitive element. Some embodiments refine the start selection index by excluding the start primitive element from the contiguous selection if the start selection point is after the midpoint of the start primitive element. The process refines (at 1790) the end selection index based on the relationship between the end selection point and the end primitive element. Some embodiments refine the end selection index by excluding the end primitive element from the contiguous selection if the end selection point is before the midpoint of the start primitive element. The refinement of the start and end selection indices (i.e., determining whether to include the start primitive element and end primitive element) will be further described in Sub-Section C below. The process 1700 ends after determining the start and end selection indices from the primitive areas closest to the selection points.

In the example of FIG. 18, the start selection point 1810 and the end selection point 1820 are translated into start selection index 1815 and end selection index 1825 for indicating the start and end positions of the contiguous selection. The start selection index 1815 is based on an index associated with the primitive area $A_3$, which is the primitive area closest to the start selection point 1810. Likewise, the end selection index 1825 is based on an index associated with the primitive area $A_5$, which is the primitive area closest to the end selection point 1820. In some embodiments, the start index 1815 and end index 1825 are based on the indices of individual elements in the primitive areas $A_3$ and $A_5$ such that the start index 1815 and end index 1825 indicate which element of which area in the contiguous selection 1830 is first and which element of which area is last. In this example, the start and end selection indices are indices that correspond to elements 1832 of $A_3$ and element 1834 of $A_5$. The element 1832 is the start primitive element and the element 1834 is the end primitive element.

A. Criteria for Determining the Closest Primitive Area

Figure 19:
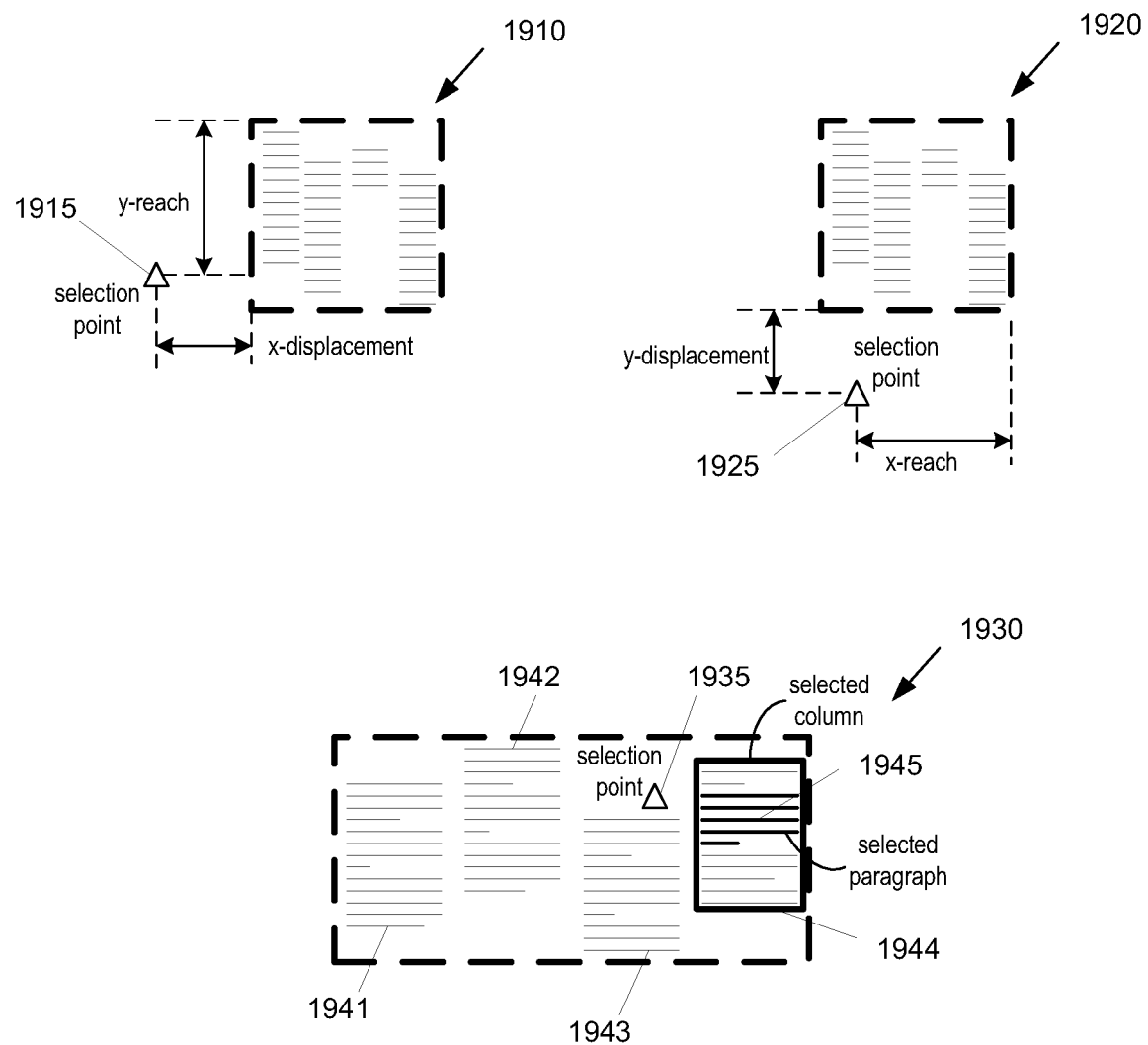
FIG. 19 illustrates several example selection points and primitive areas.

In order to determine the start and the end of a contiguous selection of document content, some embodiments first determines which of the primitive areas is closest in reading order to the start selection point and which of the primitive areas is the closest in reading order to the end selection point. Determining the closest primitive area to a selection point (start selection point or end selection point) is trivial when the selection point is within the bounds of only one primitive area. However, it is not trivial when the selection point is not within the bounds of any primitive area or when the selection point is within the bounds of two or more content items. Some embodiments therefore find the closest primitive area to a given selection point on the page by taking normal reading direction into account. In some embodiments, the "closest" primitive area is initially determined as the first primitive area reached in either of these directions. Some embodiments start with the first primitive area as the current best choice, and search through the remaining primitive areas in sequence, replacing the current best choice whenever a better one is found. FIGS. 20-24 below illustrates several criteria for comparing one primitive area with another primitive area for determining the closest primitive area. Several terms used in the description of FIGS. 20-24 will first be explained below by reference to FIG. 19. FIG. 19 illustrates several example selection points and primitive areas. As illustrated, selection point 1915 is near primitive area 1910, selection point 1925 is near primitive area 1920, and selection point 1935 is within primitive area 1930. Primitive area 1930 includes columns 1941-1944. Column 1944 includes a paragraph 1945.

In some embodiments, the notion of "x-displacement" from a selection point to an object is defined as the minimum of the absolute value of the difference between the x-coordinate of the selection point and the x-coordinate of any point within the bounds of the object, where all coordinates are in the local coordinate system of the object. In the example illustrated in FIG. 19, the selection point 1915 has a non-zero x-displacement from the layout area 1910, the x-displacement being the horizontal distance between the closest edge of the layout area 1910 and the selection point 1915. On the other hand, the selection point 1925 has a zero x-displacement with the layout area 1920, since the selection point 1925 is vertically below the layout area 1920 and the minimum of the absolute value of the difference between the x-coordinate of the selection point 1925 and the x-coordinate of any point within the bounds of the layout area 1920 is zero.

Similarly, some embodiments define the y-displacement from the selection point to the object as the minimum of the absolute value of the difference between the y-coordinate of the selection point and the y-coordinate of any point within the bounds of the object. In the example illustrated in FIG. 19, the selection point 1925 has a non-zero y-displacement from the layout area 1920, the y-displacement being the vertical distance between the closest edge of the layout area 1920 and the selection point 1925. On the other hand, the selection point 1915 has a zero y-displacement with the layout area 1910, since the selection point 1915 is horizontally to the left of the layout area 1910 and the minimum of the absolute value of the difference between the y-coordinate of the selection point 1915 and the y-coordinate of any point within the bounds of the layout area 1910 is zero. FIG. 19 also illustrates a selection point 1935 that is within the bounds of primitive area 1930. In such cases, both its x-displacement to the area and its y-displacement to the area are zero.

Some embodiments also define the selected column within a layout area as the column with least x-displacement in which there is a paragraph with zero y-displacement. In other words, some embodiments use a horizontal line (i.e., a line parallel to the x-axis of the layout area) through the selection point and find the closest column at which the line intersects the content of the paragraph. If there is no such intersection, then there is no selected column. If there is such an intersection, then the intersecting paragraph is called the selected paragraph. In the example illustrated by FIG. 19, a horizontal line drawn through the selection point 1935 would intersect columns 1941, 1942, and 1944. Specifically, this horizontal line would intersect column 1944 at the paragraph 1945. Since the column 1943 is the column with the least x-displacement that includes the paragraph 1945 with zero y-displacement, the column 1945 is the selected column (highlighted column) and the paragraph 1945 is the selected paragraph (highlighted paragraph). Some embodiments do not graphically draw the horizontal line, but instead searches along a virtual horizontal line through the selection point for determining the selected column.

Some embodiments further define the x-reach from the selection point to the object as the maximum of the absolute value of the difference between the x-coordinate of the selection point and the x-coordinate of any point within the bounds of the object. In the example illustrated by FIG. 19, the right edge of the layout area 1920 has the maximum of the absolute value of the difference between the x-coordinate of the selection point 1925 and the x-coordinate of any point within the bounds of the layout area 1920. The horizontal distance between the selection point 1925 and the right edge of the layout area 1920 is therefore the x-reach of the selection point 1925 and the layout area 1920.

1. Comparing y-Displacements

Figure 20:
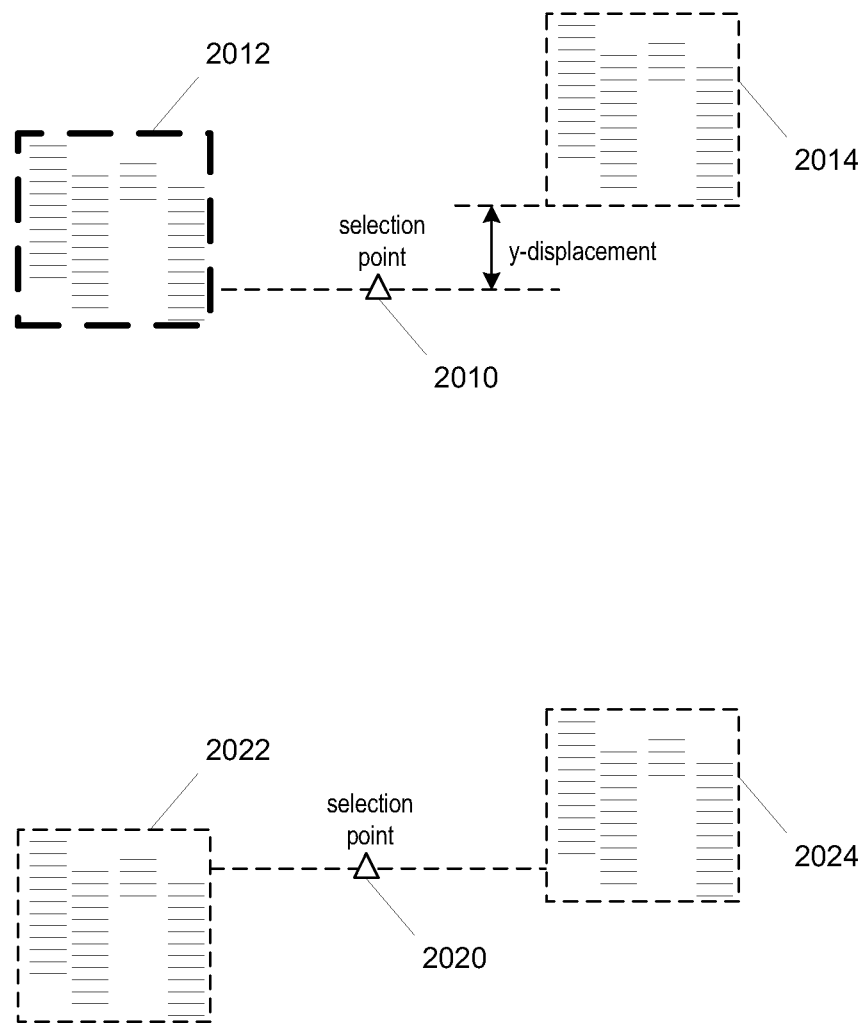
FIG. 20 illustrates the determination of the closest primitive area to a selection point based on y-displacement of the selection point.

Some embodiments choose the area with the least y-displacement from the selection point to the area. If both areas yield the same y-displacement then the choice of area remains unresolved. FIG. 20 illustrates the determination of the closest primitive area to a selection point based on y-displacement of the selection point. As illustrated, the selection point 2010 is near both layout areas 2012 and 2014, and the selection point 2020 is near both layout areas 2022 and 2024. The selection point 2010 has zero y-displacement with the layout area 2012 but a non-zero y-displacement with the layout area 2014. In this instance, the layout area 2012 (highlighted) will be considered the closest primitive area to the selection point 2010. The selection point 2020, on the other hand, has zero y-displacement to both of the layout areas 2022 and 2024. In this instance, some embodiments will forego using y-displacement to compare the two primitive areas when the y-displacements to both primitive areas are the same.

2. Layout Area within a Graphic Area

Figure 21:
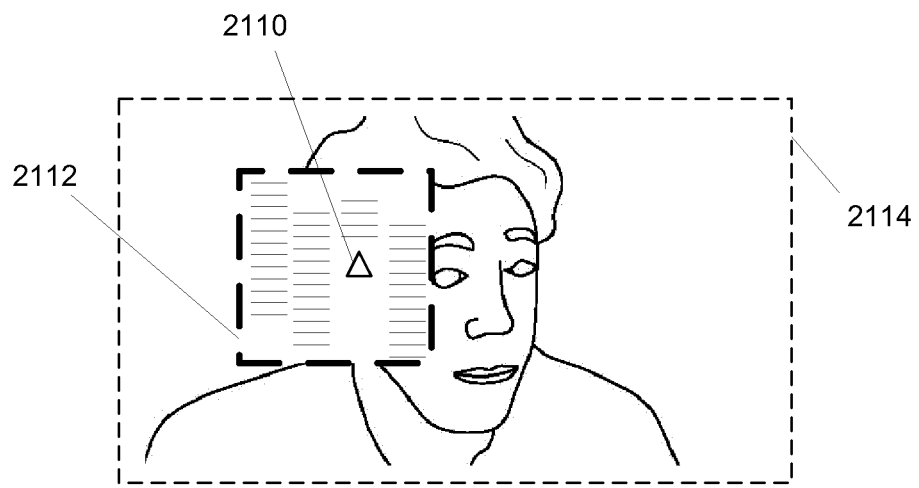
FIG. 21 illustrates the selection of a layout area as the closest primitive area when the layout area is contained within the bounds of the graphic area.
Figure 21:
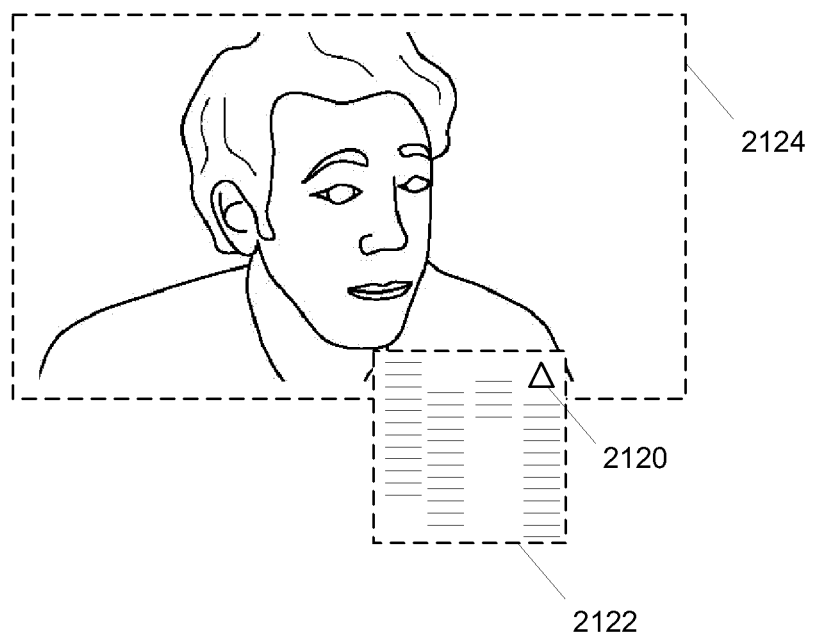

When comparing a layout area with a graphic area, if the selection point is within the layout area's interior region and this region is completely contained within the bounds of the graphic area, some embodiments select the layout area as the closest primitive area. Otherwise the choice remains unresolved. (This criterion recognizes common cases where graphics are used to visually embellish text, either as a border or background for a layout area, or as an overlaid image of the text in a layout area—as is common with OCR files created from electronic scans of printed material.) FIG. 21 illustrates the selection of a layout area as the closest primitive area when the layout area is contained within the bounds of the graphic area.

FIG. 21 illustrates selection points 2110 and 2120. The selection point 2110 is within both a layout area 2112 and a graphic area 2114. The selection point 2120 is within both a layout area 2122 and a graphic area 2124. Since the selection point 2110 is within the layout area 2112, and the layout area 2112 is entirely within the graphic area 2114, some embodiments select the layout area 2112 (highlighted) as the closest primitive area to the selection point.

On the other hand, even though the selection point 2120 is within the layout area 2122, the layout area 2122 will not be considered as the closest primitive area because it is not entirely within the graphic area 2124. Some embodiments will forego using this criterion for determining the closest primitive area to the selection point 2120 in this situation.

3. Comparing Layout Areas without Selected Columns

Figure 22:
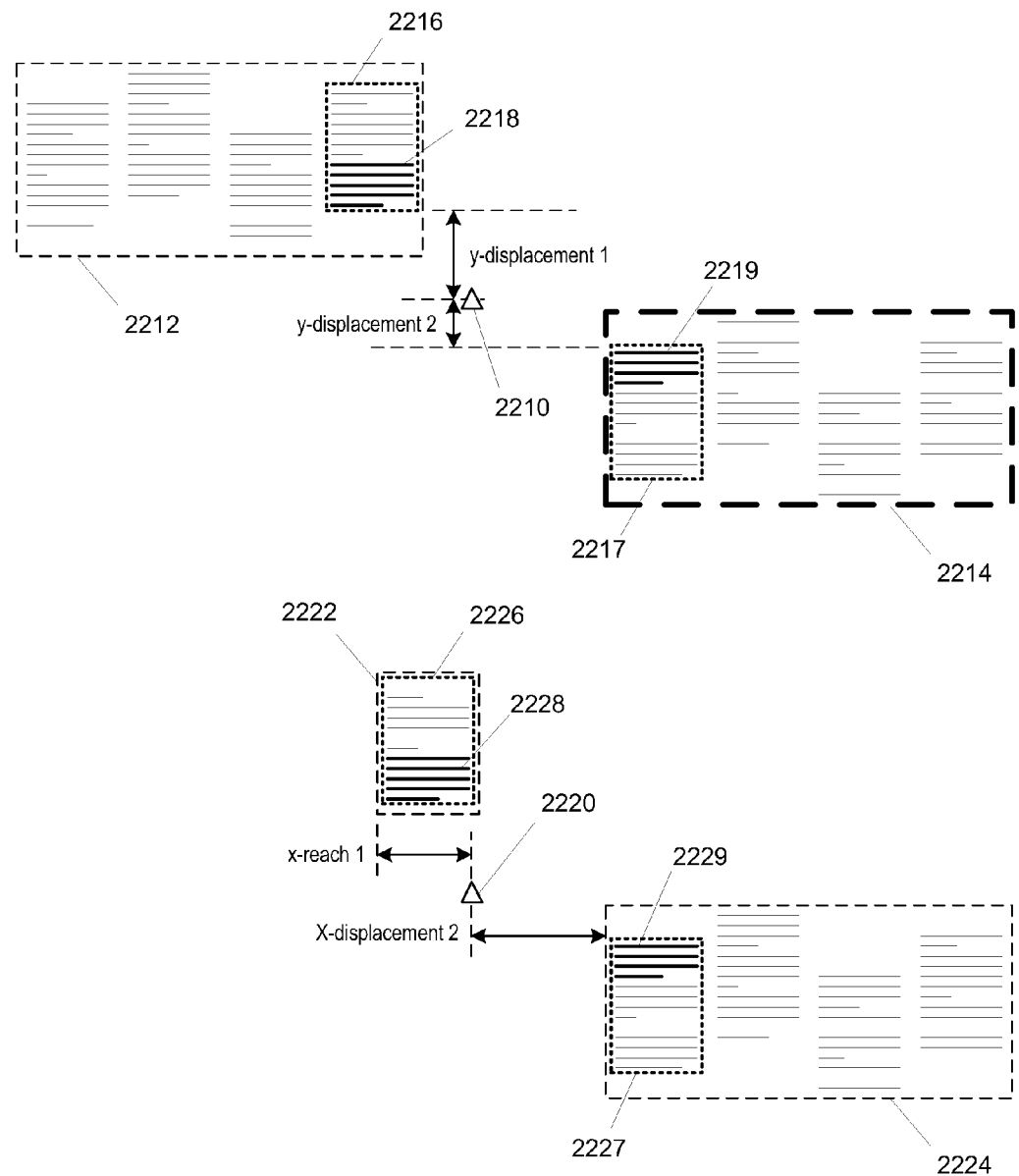
FIG. 22 illustrates the comparison of two layout areas that do not have a selected column.

When comparing two layout areas without a selected column, some embodiments determine the column with the least x-displacement and the paragraph with the least y-displacement from both layout areas. Some embodiments choose the layout area with the least y-displacement to its paragraph if the x-displacement of each area's column is less than the x-reach of the other area. In all other cases the choice remains unresolved. (In other words, if the columns do not clearly distinguish which layouts to use, then the process will look at the paragraphs.) FIG. 22 illustrates the comparison of two layout areas that do not have a selected column.

FIG. 22 illustrates selection points 2210 and 2220. The selection point 2210 is near layout areas 2212 and 2214, while the selection point 2220 is near layout areas 2222 and 2224. None of the layout areas has a selected column since horizontal lines drawn through the selection points 2210 and 2220 would not intersect any columns of any layout areas.

For the selection point 2210, the column with the least x-displacement in layout area 2212 is the column 2216, while the paragraph with the least y-displacement in the column 2216 is the paragraph 2218. The column with the least x-displacement in the layout area 2214 is the column 2217, while the paragraph with the least y-displacement in the column 2217 is the paragraph 2219. Since the y-displacement to the paragraph 2219 (y-displacement 2) is less than the y-displacement to the paragraph 2218 (y-displacement 1), the layout area containing the paragraph 2219 will be selected as the closest primitive area to the selection point 2210.

For the selection point 2220, the column with the least x-displacement in layout area 2222 is the column 2226, while the paragraph with the least y-displacement in the column 2226 is the paragraph 2228. The column with the least x-displacement in the layout area 2224 is the column 2227, while the paragraph with the least y-displacement in the column 2227 is the paragraph 2229. Even though the y-displacement from the selection point 2220 to the paragraph 2229 is less than y-displacement to the paragraph 2228, the layout area 2224 will not be selected because the x-displacement from the selected point to the layout area 2224 is greater than the x-reach to the other layout area 2222. Some embodiments will forego using this criterion for determining the closest primitive area to the selection point 2220 in this situation.

4. Comparing x-Displacements

Some embodiments choose the primitive area with the least x-displacement value from the selection point to the area. In some of these embodiments, the x-displacement value is determined based on the type of area. For layout areas with a selected column, the x-displacement from the selection point to the selected column is used as the x-displacement of the layout area. For layout areas without a selected column, the x-reach from the selection point to area is used as the x-displacement value. For all other areas (such as graphic areas), the x-displacement from the selection point to area is used as the x-displacement value of the area.

Figure 23:
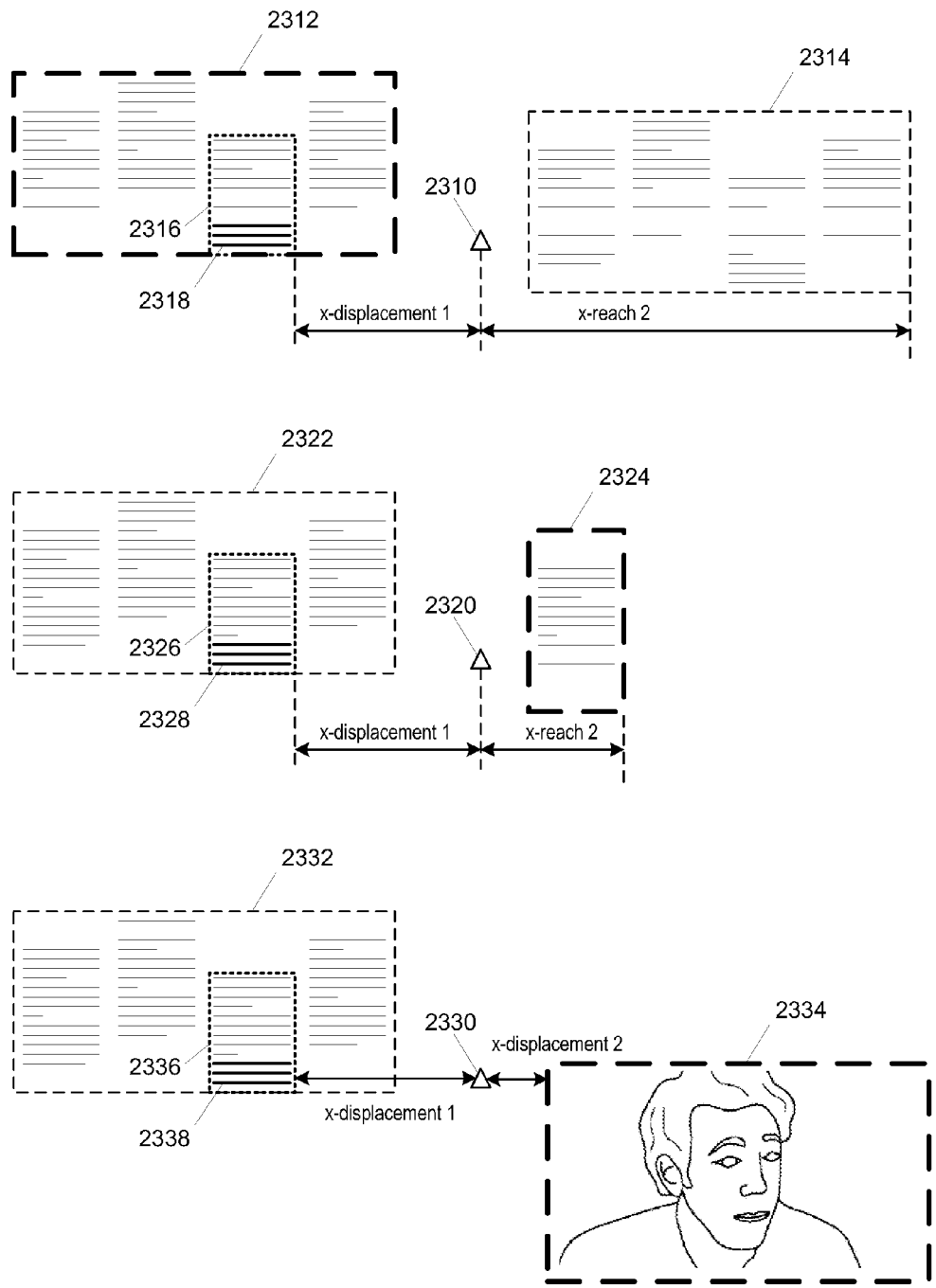
FIG. 23 illustrates the comparison of primitive areas based on various determinations of x-displacement values.

FIG. 23 illustrates the comparison of primitive areas based on various determinations of x-displacement values. FIG. 23 illustrates selection points 2310, 2320, and 2330. The selection point 2310 is near layout areas 2312 and 2314. The selection point 2320 is near layout areas 2322 and 2324. The selection point 2330 is near layout areas 2332 and graphic area 2334.

For the selection point 2310, the layout area 2312 has a selected column 2316 and a selected paragraph 2318. The x-displacement value of the layout area 2312 is therefore the x-displacement from the selection point 2310 to the selected paragraph 2318 (x-displacement 1). The layout area 2314, on the other hand, does not have a selected column, thus the x-displacement value of the layout area 2314 is its x-reach. Since the x-displacement value of the layout area 2314 (its x-reach) is greater than the x-displacement value of the layout area 2312, the layout area 2312 is determined to be the closest primitive area to the selection point 2310.

For the selection point 2320, the layout area 2322 has a selected column 2326 and a selected paragraph 2328. The x-displacement value of the layout area 2322 is therefore the x-displacement from the selection point 2320 to the selected paragraph 2328 (x-displacement 1). The layout area 2324, on the other hand, does not have a selected column, thus the x-displacement value of the layout area 2324 is its x-reach. Since the x-displacement value of the layout area 2324 (its x-reach) is less than the x-displacement value of the layout area 2322, the layout area 2324 is determined to be the closest primitive area to the selection point 2320.

For the selection point 2330, the layout area 2332 has a selected column 2336 and a selected paragraph 2338. The x-displacement value of the layout area 2332 is therefore the x-displacement from the selection point 2330 to the selected paragraph 2338 (x-displacement 1). The area 2334 is a graphic area. The x-displacement from the selection point 2330 to the graphic area 2334 (x-displacement 2) is used as the x-displacement value of the area. Since the x-displacement value of the graphic area 2334 is less than the x-displacement value of the layout area 2332, the graphic area 2334 is determined to be the closest primitive area to the selection point 2330.

5. Comparing x-Displacements of Selected Columns

Figure 24:
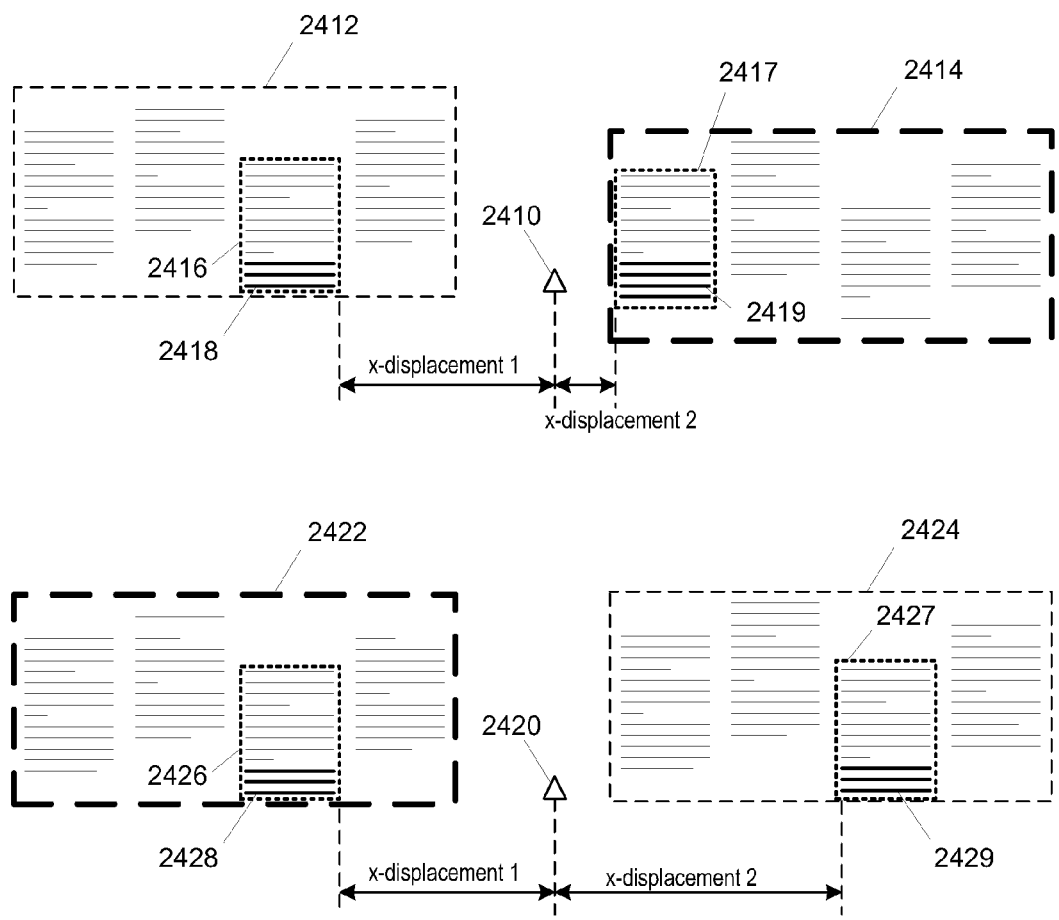
FIG. 24 illustrates the comparison of layout areas with selected columns by determining which layout area has the selected column with the least x-displacement from the selection point.

When comparing two layout areas with selected columns, some embodiments choose the area with the least x-displacement from the selection point to the selected paragraph. FIG. 24 illustrates the comparison of layout areas with selected columns by determining which layout area has the selected column with the least x-displacement from the selection point.

FIG. 24 illustrates selection points 2410 and 2420. The selection point 2410 is near layout areas 2412 and 2414. The selection point 2420 is near layout areas 2422 and 2424.

For the selection point 2410, the layout area 2412 has a selected column 2416 and a selected paragraph 2418. The x-displacement value of the layout area 2412 is therefore the x-displacement from the selection point 2410 to the selected paragraph 2418 (x-displacement 1). The layout area 2414 likewise has a selected column 2417 with a selected paragraph 2419. The x-displacement value of the layout area 2414 is therefore the x-displacement from the selection point 2410 to the selected paragraph 2419 (x-displacement 2). Since the x-displacement value of the layout area 2414 is less than the x-displacement value of the layout area 2412, the layout area 2414 is determined to be the closest primitive area to the selection point 2410.

For the selection point 2420, the layout area 2422 has a selected column 2426 and a selected paragraph 2428. The x-displacement value of the layout area 2422 is therefore the x-displacement from the selection point 2420 to the selected paragraph 2428 (x-displacement 1). The layout area 2424 likewise has a selected column 2427 with a selected paragraph 2429. The x-displacement value of the layout area 2424 is therefore the x-displacement from the selection point 2420 to the selected paragraph 2429 (x-displacement 2). Since the x-displacement value of the layout area 2424 is greater than the x-displacement value of the layout area 2422, the layout area 2422 is determined to be the closest primitive area to the selection point 2420.

Some embodiments compare the candidate primitive areas by using a priority list of criterions. Some embodiments start the comparison by using the highest priority criterion. If one criterion in the list is unable to resolve which of the two candidate primitive areas to choose, then the next criterion is applied. For some embodiments, the priority list of criterions is as follows:

1. Choose the area with the least y-displacement from the selection point to the area. If both areas yield the same y-displacement then the choice of area remains unresolved. Examples of the application of this criterion are described above by reference to FIG. 20.

2. When comparing a layout area with a graphic area, if the selection point is within the layout area's interior region and this region is completely contained within the bounds of the graphic area, select the layout area. Otherwise the choice remains unresolved. Examples of the application of this criterion are described above by reference to FIG. 21.

3. When comparing two layout areas, if neither of them has a selected column, then determine the column in each layout area that has the least x-displacement from the selection point to the column and determine the paragraph within each of these two columns that has the least y-displacement from the selection point to the paragraph. If the x-displacement of each area's column is less than the x-reach of the other area, then choose the layout area with the least y-displacement to its paragraph. In all other cases the choice remains unresolved. Examples of the application of this criterion are described above by reference to FIG. 22.

4. Choose the area with the least displacement value of the type appropriate for the area. For layout areas with a selected column, use the x-displacement from the selection point to the selected column. For layout areas without a selected column, use the x-reach from the selection point to the area. For all other types of areas, use the x-displacement from the selection point to those areas. Examples of the application of this criterion are described above by reference to FIG. 23.

5. When comparing two layout areas with selected columns, choose the area with the least x-displacement from the selection point to the selected paragraph. Examples of the application of this criterion are described above by reference to FIG. 24.

6. Choose the topmost area. In some embodiments, each area is assigned a unique "z-order" for ensuring that no ambiguity exist regarding which content is drawn over which other content. Some of these embodiments resolve any remaining ties between areas by selecting the topmost area as indicated by z-order.

After having determined the "closest" primitive area to the start selection point and the "closest" primitive area to the end selection point, some embodiments examine both primitive areas to verify if selection points need to be revised. For example, if the start point is in area $A_1$ and the end point is in area $A_2$, and area $A_2$ is entirely within the bounds of $A_1$, some embodiments would perform additional analysis in order to determine if the end point needs to be moved out of $A_2$ and into $A_1$, since it is likely that the user did not intend to have the end selection point in area $A_2$.

B. Determining Selection Index

In some embodiments, a contiguous selection defined by two selection points begins on the index of the closest element in the flow to the start selection point, and ends on the index of the closest element in the flow to the end selection point. Once the closest primitive areas to the start selection point and the end selection points have been determined, some embodiments determine the start selection index and the end selection index based on the position of the start selection point and end selection point in relation to the respective closest primitive areas.

For a primitive area that is a graphic area, some embodiments use the graphic area's index as the selection index. For a primitive area that is a layout area, some embodiments determine the selection index based on the selected column of the layout area. If the layout area does not have a selected column, some embodiments use the column with the least x-displacement from the selection point to the column for determining the selection index.

Within this column (whether it's the selected column or the column with the least x-displacement), some embodiments determine the paragraph with the least y-displacement from the selection point to the paragraph. If this y-displacement is non-zero and the selection point is above the paragraph, then the first index of the paragraph is used as the selection index. If this y-displacement is non-zero and the selection point is below the paragraph, then the last index of the paragraph is used as the selection index. On the other hand, if this y-displacement is zero and the selection point is within the paragraph, some embodiments determine the selection index by determining a text line in the paragraph with the least y-displacement from the selection point to the text line. Within that text line, the character or inline graphic with the least x-displacement from the selection point is used to determine the selection index.

Figure 25:
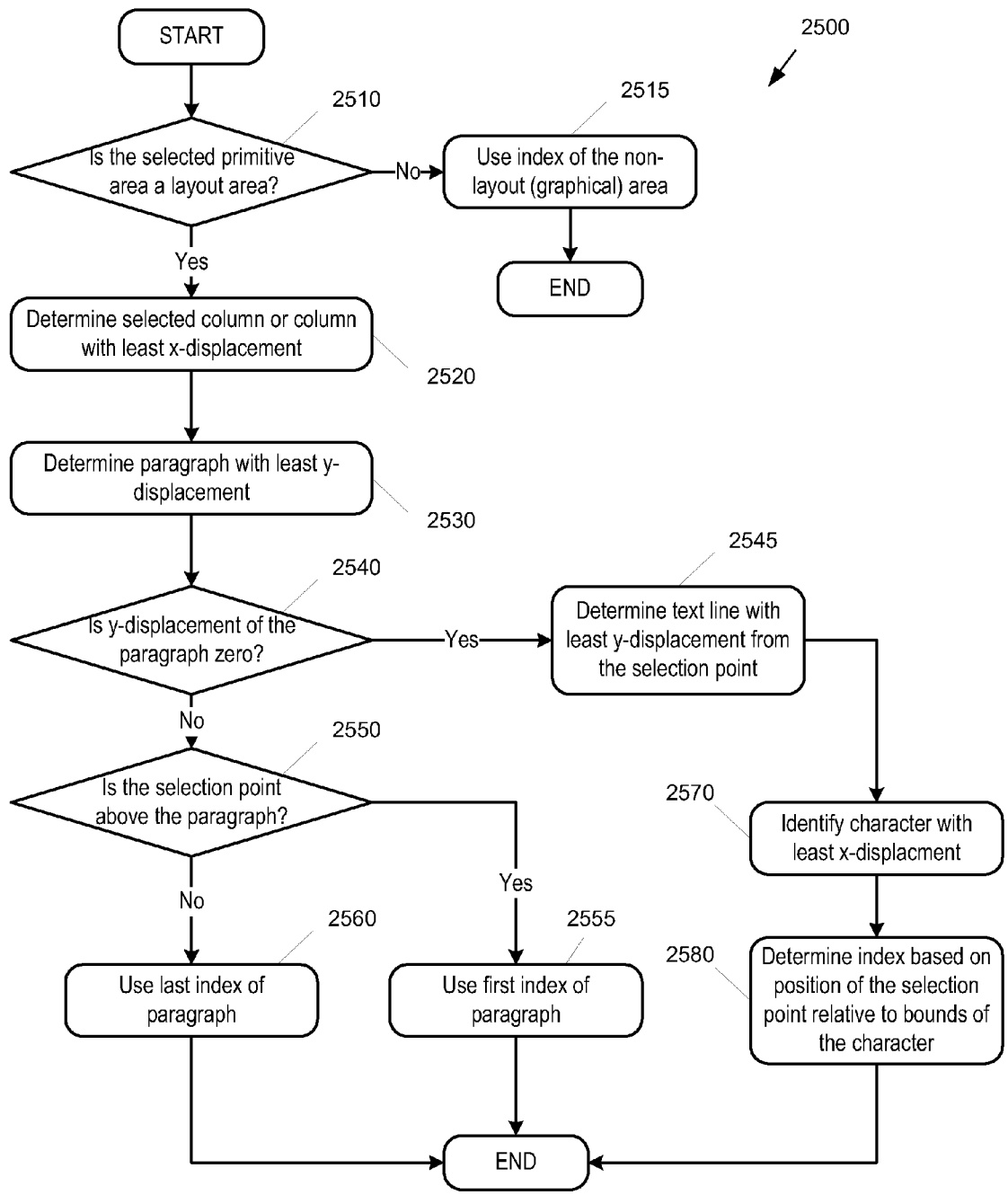
FIG. 25 conceptually illustrates a process for determining a selection index based on the primitive area closest to the selection point using various criteria.
Figure 26:
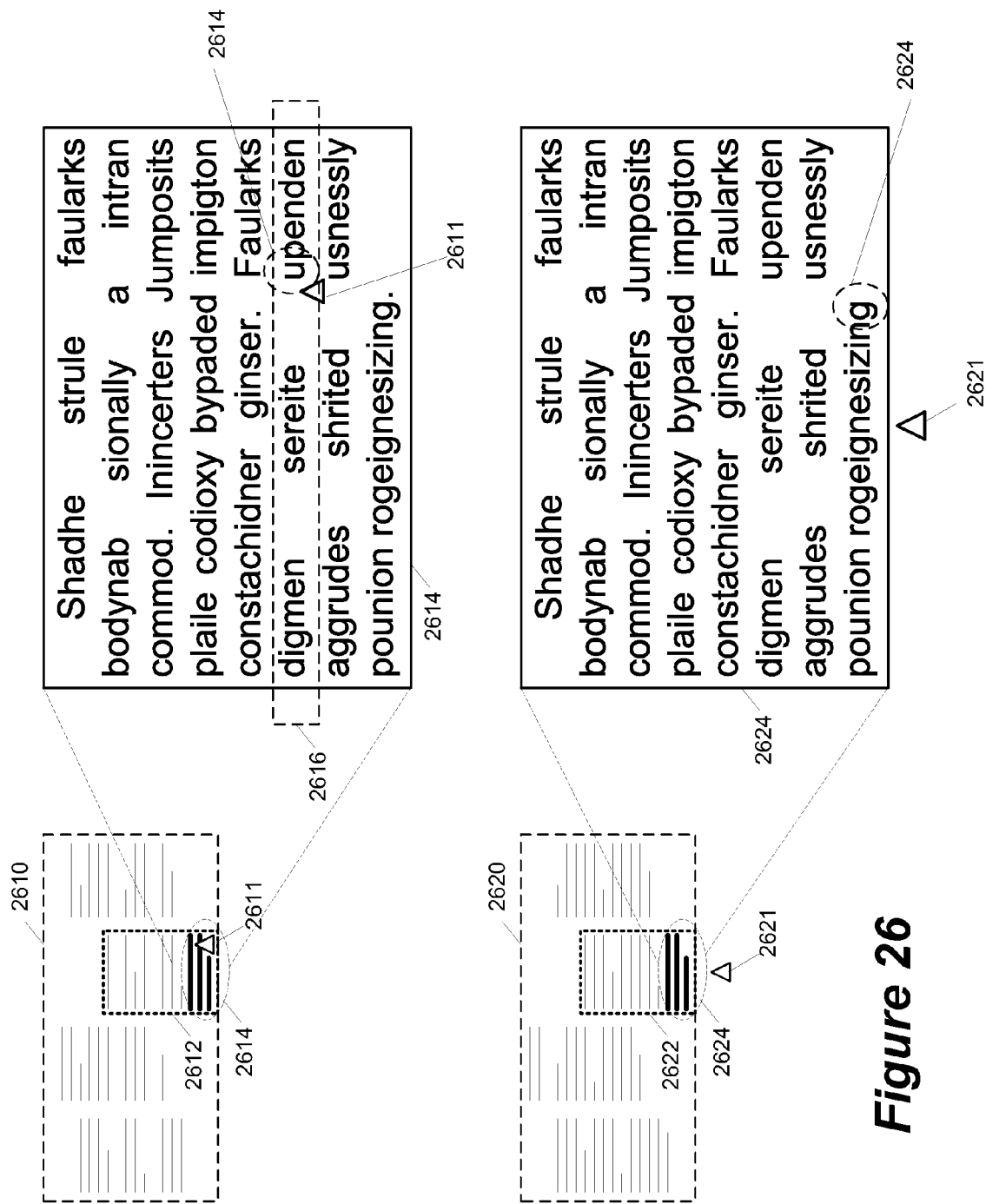
FIG. 26 illustrates the relationship between the location of the selection point and the determination of the selection index.

For some embodiments, FIG. 25 conceptually illustrates a process 2500 for determining a selection index based on the primitive area closest to the selection point. In some embodiments, the process 2500 is performed during operations 1750 and/or 1760 of FIG. 17 for determining the start selection index and the end selection index. FIG. 25 will be described by reference to examples illustrated in FIG. 26. FIG. 26 illustrates the relationship between the location of the selection point and the determination of the selection index. As illustrated, FIG. 26 includes layout areas 2610 and 2620. FIG. 26 also illustrates selection points 2611 and 2621 for performing selections within the layout areas 2610 and 2620, respectively.

The process 2500 of FIG. 25 starts when a primitive area has been selected as the primitive area closest to the selection point. In some embodiments, the primitive area closest to the selection point is determined using criterions discussed above in sections II-a. In the example illustrated in FIG. 26, the layout area 2610 is the primitive area closest the selection point 2611 and the layout area 2620 is the primitive area closest to the selection point 2621.

The process 2500 determines (at 2510) whether the primitive area selected as being the closest primitive area is a layout area. If the closest primitive area is a layout area that has multiple elements associated with multiple indices, the process proceeds to 2520. Both primitive areas 2610 and 2620 in FIG. 26 are layout areas that have multiple elements with multiple indices. If the closest primitive area is a non-layout (e.g., graphic) area that has only one element associated with one index, the process proceeds to 2515 to apply the index of the non-layout area as the selection index and ends.

The process determines (at 2520) a selected column or the column with the least x-displacement for a layout area without a selected column. Based on the column determination, the process determines (at 2530) a paragraph in the selected column or the column with the least x-displacement that has the least y-displacement. In the examples illustrated in FIG. 26, the selection point 2611 is inside a paragraph 2614 of a column 2612. The paragraph 2614 is the thus the selected paragraph with the least y-displacement for the selection point 2611. For the selection point 2621, the paragraph 2624 is the paragraph with the least y-displacement. The paragraph 2624 is thus the selected paragraph for the selection point 2621.

Next, the process determines (at 2540) whether the y-displacement of the selected paragraph is zero. If the y-displacement of the selected paragraph is not zero, the process proceeds to 2550. If the y-displacement of the selected paragraph is zero, the process proceeds to 2545 to determine the text line in the selected paragraph that has the least y-displacement. In the examples illustrated in FIG. 26, the selection point 2611 is inside its selected paragraph 2614 and therefore the y-displacement of the selected paragraph is zero. On the other hand, the selection point 2621 is below its selected paragraph 2624 and therefore the y-displacement of the selected paragraph is non-zero.

The process next identifies (at 2570) the character in the text line with the least x-displacement, and determines (at 2580) the selection index based on the position of the selection point relative to the bounds of the character. After determining the selection index, the process ends. In the examples illustrated in FIG. 26, the text line with the least y-displacement from the selection point 2611 is the text line 2616. The character within the text line 2616 that has the least x-displacement from the selection point 2611 is the character 2617 (the letter 'u' in the word "upenden"). A selection index will be generated based on the position of the selection point 2611 relative to the bounds of the character 2617.

At 2550, the process determines whether the selection point is above the selected paragraph. If the selection point is above the selected paragraph, the process uses (at 2555) the first index of the paragraph as the selection index. If the selection point is below the selected paragraph, the process uses (at 2560) the last index of the paragraph as the selection index. After determining the selection index, the process ends. In the examples illustrated in FIG. 26, the selection point 2621 is below the selected paragraph 2624. The process 2500 would therefore use the last index of the selected paragraph 2624, which in some embodiments corresponds to a position at or after character 2627 (the letter 'g' in the word "rogeignesizing").

C. Refining the Contiguous Selection

A contiguous selection of primitive elements in an ordered list is defined in some embodiments to start at a start primitive element that corresponds to the start selection index and end at an end primitive element that corresponds to the end selection index. Depending on the position of the start selection point relative to the start primitive element (and the position of the end selection point relative to the end primitive element), some embodiments further refine the start and the end of the contiguous selection by either including or excluding the start or end primitive element. In some embodiments, whether to include or exclude the primitive element at the beginning or the end of the selection generally depends on where the selection point falls relative to the bounds of the primitive element and its ancestors.

In some embodiments, a start selection point that is below the text line of the start primitive element or within the vertical extent of the text line but to the right of the center divider of the start primitive element causes the start primitive element to be excluded from the contiguous selection, while a start selection point that is above the text line or within the vertical extent of the text line but to the left of the center divider of the start primitive element causes the start primitive element to be included in the contiguous selection. The opposite is true for the end primitive element in some embodiments: an end selection point that is below the text line of the start primitive element or within the vertical extent of the text line but to the right of the center divider of the start primitive element causes the end primitive element to be included in the contiguous selection, while an end selection point that is above the text line or within the vertical extent of the text line but to the left of the center divider of the start primitive element causes the end primitive element to be excluded from the contiguous selection.

Figure 27:
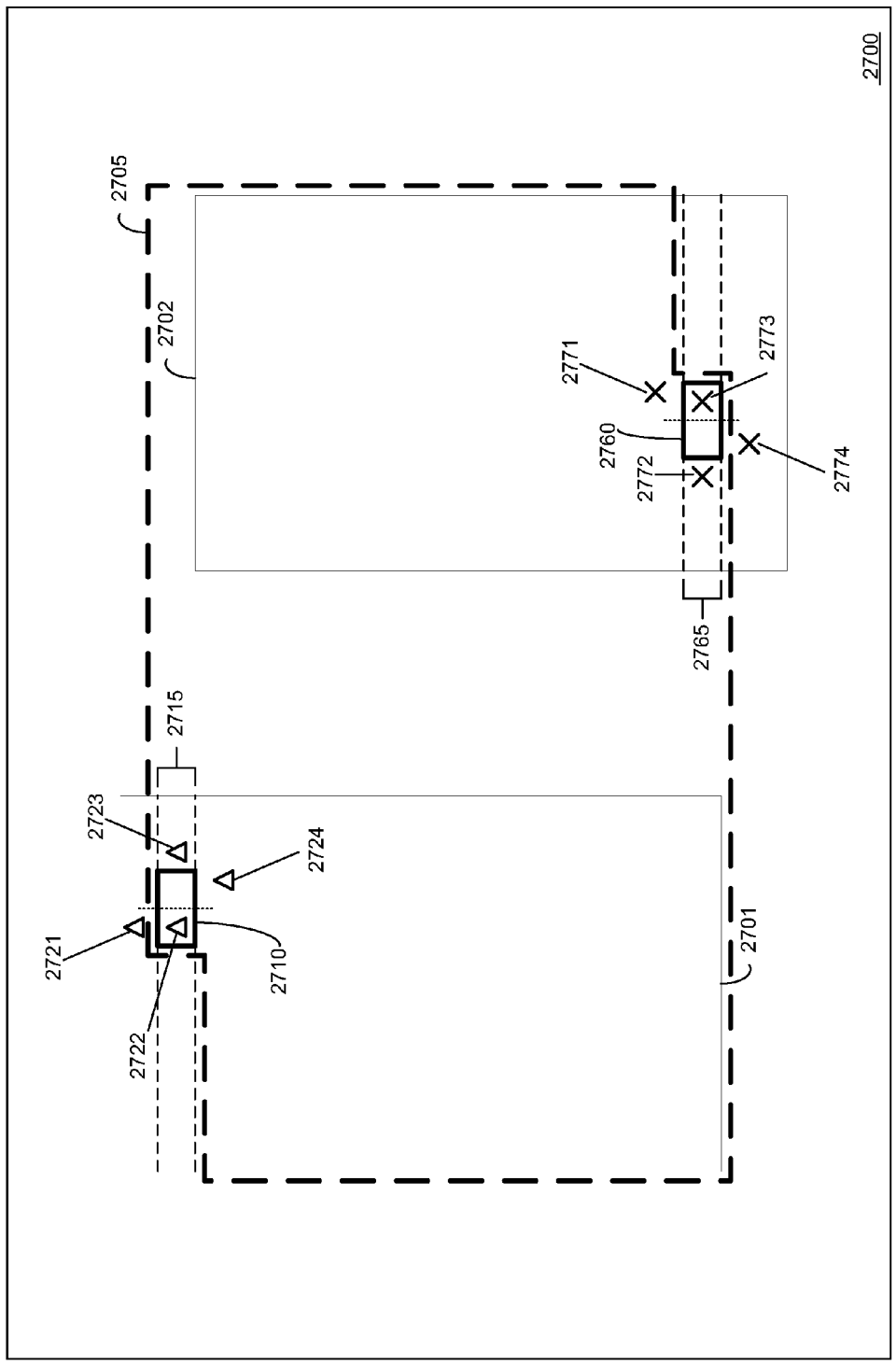
FIG. 27 illustrates examples of determining whether to include or exclude a primitive element at either end of a contiguous selection.

For some embodiments, FIG. 27 illustrates examples of determining whether to include or exclude a primitive element at either end of a contiguous selection. FIG. 27 illustrates a document page 2700 with a contiguous selection 2705 that starts at a start primitive element 2710 and ends at an end primitive element 2760. The start primitive element 2710 is in a layout area 2701 and the end primitive element is in a layout area 2702. The primitive element 2710 is in a text line 2715. The primitive element 2760 is in a text line 2765. In some embodiments, the primitive element can be a standalone object that is not inline. In these instances, the text line is defined by the bounds of the primitive element.

The figure illustrates several example locations 2721-2724 near the start primitive element 2710. The example location 2721 is above the text line 2715 that includes the start primitive element 2710. The example location 2722 is to the left of the center divider of the primitive element 2710 and within the vertical extent of the text line 2715. The example location 2723 is to the right of the center divider and within the vertical extent of the text line 2715. The example location 2724 is below the text line 2715.

In some embodiments, if the start selection point that defines the contiguous selection 2705 is at either example location 2721 or 2722 then the primitive element 2710 will be included in the contiguous selection. On the other hand, if the start selection point is at either location 2723 or 2724 then the primitive element 2710 will not be included in the contiguous selection. Some embodiments then refine the contiguous selection by adjusting the start selection index to correspond to a primitive element immediately after the primitive element 2710.

FIG. 27 also illustrates several example locations 2771-2774 near the end primitive element 2760. The example location 2771 is above the text line 2765 that includes the end primitive element 2760. The example location 2772 is to the left of the center divider of the primitive element 2760 and within the vertical extent of the text line 2765. The example location 2773 is to the right of the center divider and within the vertical extent of the text line 2765. The example location 2774 is below the text line 2765.

In some embodiments, if the end selection point that defines the contiguous selection 2705 is at either example location 2773 or 2774 then the primitive element 2760 will be included in the contiguous selection. On the other hand, if the start selection point is at either location 2771 or 2772 then the primitive element 2760 will not be included in the contiguous selection. Some embodiments then refine the contiguous selection by adjusting the end selection index to correspond to a primitive element immediately before the primitive element 2760.

In different embodiments, a line other than the center line of the primitive element can be used to consistently determine whether to include or exclude the primitive element. For example, the left or right side of the start primitive element can be used to determine whether the start primitive element is included in some embodiments.

III. Software Architecture

Figure 28:
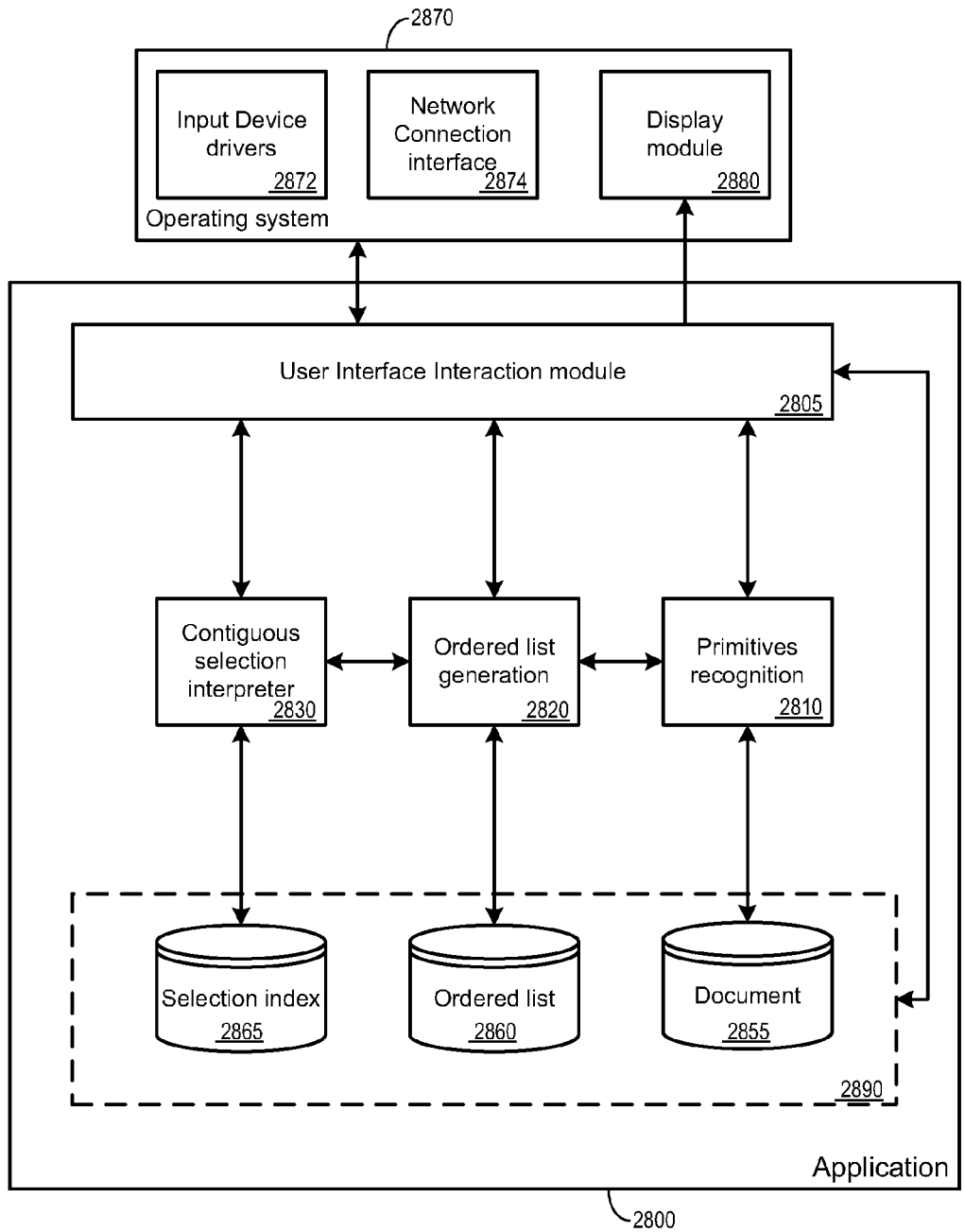
FIG. 28 conceptually illustrates the software architecture of a document editing application of some embodiments.

In some embodiments, the processes described above are implemented as software running on a particular machine, such as a computer or a handheld device, or stored in a computer readable medium. FIG. 28 conceptually illustrates the software architecture of a document editing application 2800 of some embodiments. In some embodiments, the document editing application is a stand-alone application or is integrated into another application, while in other embodiments the application might be implemented within an operating system. Furthermore, in some embodiments, the application is provided as part of a server-based solution. In some of these embodiments, the application is provided via a thin client. That is, the application runs on a server while a user interacts with the application via a separate machine that is remote from the server. In other such embodiments, the application is provided via a thick client. That is, the application is distributed from the server to the client machine and runs on the client machine.

The document editing application 2800 includes a user interface (UI) module 2805, an ordered list generation module 2820, a primitives recognition module 2810, and a contiguous selection interpreter module 2830. The document editing application also includes document storage 2855, ordered list storage 2860, and selection index storage 2865. In some embodiments, storages 2855, 2860, and 2865 are stored in one physical storage 2890. In other embodiments, the storages are in separate physical storages, or two of the storages are in one physical storage, while the third storage is in a different physical storage. For instance, the document storage 2855, the ordered list storage 2860, and the selection index storage 2865 will often not be separated in different physical storages.

FIG. 28 also illustrates an operating system 2870 that includes input device driver(s) 2872, a display module 2880, and network connection interface(s) 2874. In some embodiments, as illustrated, the input device drivers 2872, the display module 2880, and the network connection interfaces 2874 are part of the operating system 2870, even when the document editing application is an application separate from the operating system.

The input device drivers 2872 may include drivers for translating signals from a keyboard, mouse, touchpad, drawing tablet, touchscreen, etc. A user interacts with one or more of these input devices, which send signals to their corresponding device driver. The device driver then translates the signals into user input data that is provided to the UI interaction module 2805.

The document editing application 2800 of some embodiments includes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the input device. An example of a device with such functionality is a touch screen device (e.g., as incorporated into a smart phone, a tablet computer, etc.). In some embodiments with touch control, a user directly manipulates objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 2880 translates the output of a user interface for a display device. That is, the display module 2880 receives signals (e.g., from the UI interaction module 2805) describing what should be displayed and translates these signals into pixel information that is sent to the display device. The display device may be an LCD, plasma screen, CRT monitor, touchscreen, etc.

The network connection interfaces 2874 enable the device on which the document editing application 2800 operates to communicate with other devices (e.g., a storage device located elsewhere in the network that stores documents that needs to be processed) through one or more networks. The networks may include wireless voice and data networks such as GSM and UMTS, 802.11 networks, wired networks such as Ethernet connections, etc.

The UI interaction module 2805 of document editing application 2800 interprets the user input data received from the input device drivers and passes it to various modules, including the primitives recognition module 2810, the ordered list generation module 2820, and the contiguous selection interpreter module 2830. The UI interaction module 2805 also manages the display of the UI, and outputs this display information to the display module 2880. This UI display information may be based on information from the contiguous selection interpreter module 2830, from the ordered list generation module 2820, from the primitives recognition module 2810, from storage 2890, or directly from input data (e.g., when a user moves an item in the UI that does not affect any of the other modules of the application 2800).

The primitives recognition module 2810 receives commands from user interface module 2805 and processes document pages stored in the document storage 2855 into primitives such as characters, paragraphs, columns, layout areas, and graphic areas. In some embodiments, the primitives recognition module 2810 also create structures such as tree structures that group primitives into sections according to visible dividers in a page.

The ordered list generation module 2820 receives command from the user interface module 2805 and generates an ordered list using the primitives that have been recognized by the primitives recognition module 2810. In some embodiments, the ordered list generation module 2820 includes sub-modules that perform start point order relation ordering and contextual relation ordering as described above by reference to FIGS. 8-16. The ordered list generated by the ordered list generation module 2820 is stored in the ordered list storage 2860. In some embodiments the ordered list generation module 2820 also assigns order indices for each primitive in the list.

The contiguous selection interpreter module 2830 receives commands from the user interface module 2805 and generates a start selection point and an end selection point. In some embodiments, the start selection point and the end selection point are generated based on a pair of user selection coordinates supplied by the user interface module 2805. The contiguous selection interpreter module 2830 then searches the ordered list storage 2860 to identify primitives in the ordered list that are closest to the start and end selection points. Based on the identified primitives, the contiguous selection interpreter module 2830 generates a start selection index and an end selection index for the user interface module 2805.

While many of the features have been described as being performed by one module (e.g., the ordered list generation module 2820 or the contiguous selection interpreter module 2830) one of ordinary skill in the art will recognize that the functions described herein might be split up into multiple modules. Similarly, functions described as being performed by multiple different modules might be performed by a single module in some embodiments (e.g., start point order relation comparison, contextual order relation comparison, etc.).

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 29:
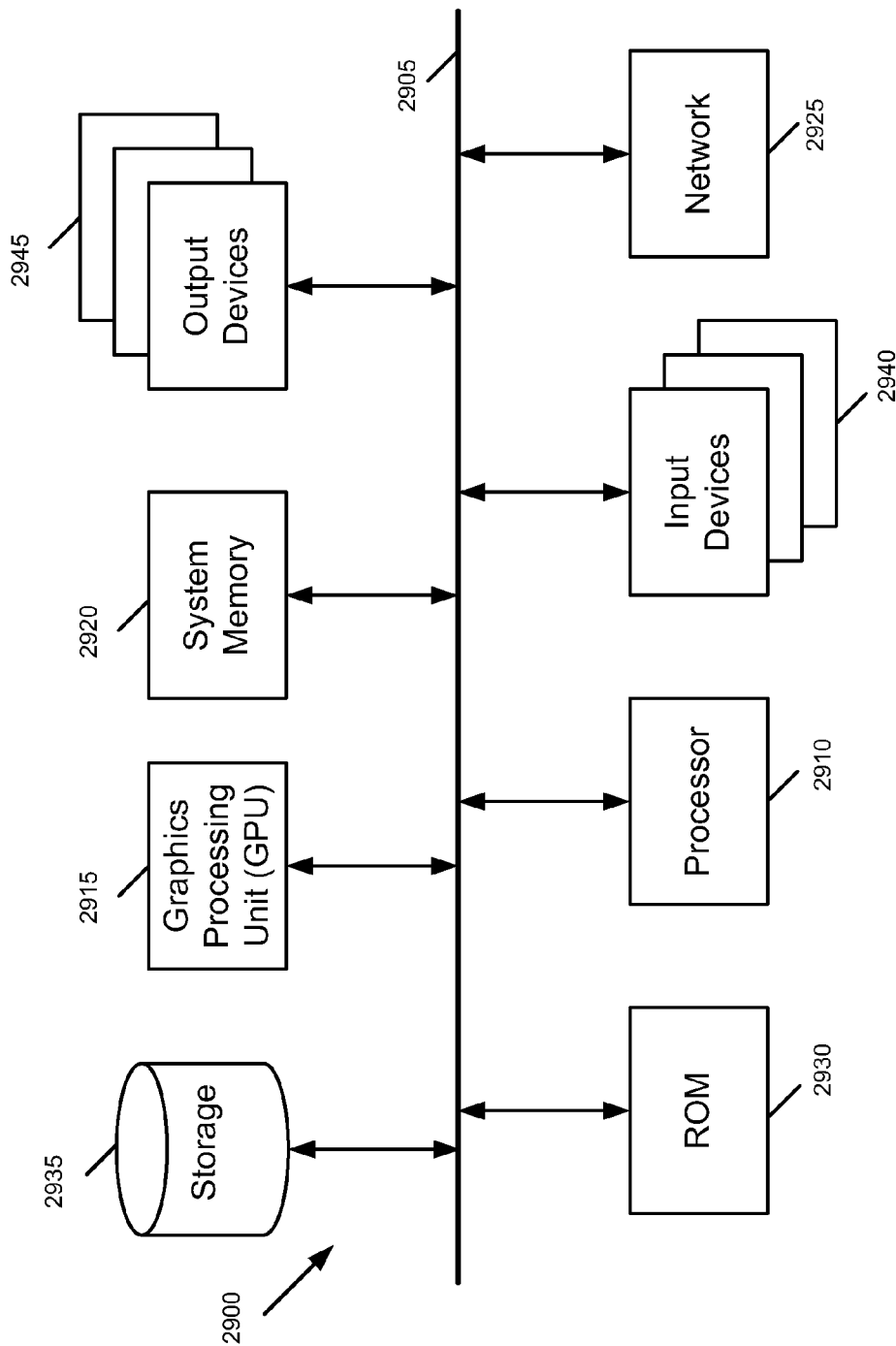
FIG. 29 conceptually illustrates a computer system with which some embodiments of the invention are implemented.

FIG. 29 conceptually illustrates an electronic system 2900 with which some embodiments of the invention are implemented. The electronic system 2900 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 2900 includes a bus 2905, processing unit(s) 2910, a graphics processing unit (GPU) 2915, a system memory 2920, a network 2925, a read-only memory 2930, a permanent storage device 2935, input devices 2940, and output devices 2945.

The bus 2905 collectively represents all system, peripheral, and chipset buses that communicatively connect the numerous internal devices of the electronic system 2900. For instance, the bus 2905 communicatively connects the processing unit(s) 2910 with the read-only memory 2930, the GPU 2915, the system memory 2920, and the permanent storage device 2935.

From these various memory units, the processing unit(s) 2910 retrieves instructions to execute and data to process in order to execute the processes of the invention. The processing unit(s) may be a single processor or a multi-core processor in different embodiments. Some instructions are passed to and executed by the GPU 2915. The GPU 2915 can offload various computations or complement the image processing provided by the processing unit(s) 2910. In some embodiments, such functionality can be provided using CoreImage's kernel shading language.

The read-only-memory (ROM) 2930 stores static data and instructions that are needed by the processing unit(s) 2910 and other modules of the electronic system. The permanent storage device 2935, on the other hand, is a read-and-write memory device. This device is a non-volatile memory unit that stores instructions and data even when the electronic system 2900 is off. Some embodiments of the invention use a mass-storage device (such as a magnetic or optical disk and its corresponding disk drive) as the permanent storage device 2935.

Other embodiments use a removable storage device (such as a floppy disk, flash memory device, etc., and its corresponding disk drive) as the permanent storage device. Like the permanent storage device 2935, the system memory 2920 is a read-and-write memory device. However, unlike storage device 2935, the system memory 2920 is a volatile read-and-write memory, such a random access memory. The system memory 2920 stores some of the instructions and data that the processor needs at runtime. In some embodiments, the invention's processes are stored in the system memory 2920, the permanent storage device 2935, and/or the read-only memory 2930. For example, the various memory units include instructions for processing multimedia clips in accordance with some embodiments. From these various memory units, the processing unit(s) 2910 retrieves instructions to execute and data to process in order to execute the processes of some embodiments.

The bus 2905 also connects to the input and output devices 2940 and 2945. The input devices 2940 enable the user to communicate information and select commands to the electronic system. The input devices 2940 include alphanumeric keyboards and pointing devices (also called "cursor control devices"), cameras (e.g., webcams), microphones or similar devices for receiving voice commands, etc. The output devices 2945 display images generated by the electronic system or otherwise output data. The output devices 2945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 29, bus 2905 also couples electronic system 2900 to a network 2925 through a network adapter (not shown). In this manner, the computer can be a part of a network of computers (such as a local area network ("LAN"), a wide area network ("WAN"), or an Intranet, or a network of networks, such as the Internet. Any or all components of electronic system 2900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 9, 14, 17, 25, and 26) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for defining a reading order through a plurality of primitive areas of a document page, the method comprising:

sorting the plurality of primitive areas into a sorted sequence of primitive areas according to a first sorting criteria based on locations of the primitive areas within the document page;

selecting a successive pair of primitive areas in the sorted sequence comprising a first primitive area and a second primitive area;

designating one of the first and second primitive areas as a primary area and the other primitive area as a secondary area based on a second sorting criteria that compares start points of the first and second primitive areas within a coordinate system of the first primitive area and compares the start points of the first and second primitive areas within a coordinate system of the second primitive area in order to determine the primary and secondary areas;

comparing a location of the start point of the primary area with respect to the secondary area according to the second sorting criteria;

transposing the first primitive area with the second primitive area in the sorted sequence of primitive areas when the comparison of the start point of the primary area with respect to the secondary area satisfies the second sorting criteria; and generating an ordered list to define the reading order through the primitive areas based on the transposed sequence of primitive areas.

2. The method of claim 1, wherein designating one of the first and second primitive areas as the primary area and the other primitive area as the secondary area based on the second sorting criteria further comprises:

identifying start points of the first and the second primitive areas; and comparing the start points of the first and second primitive areas identified under a coordinate system of the page.

3. The method of claim 1, wherein the first sorting criteria is further based on a comparison of start points of the plurality of primitive areas and the second sorting criteria is further based on a reading flow of one of the two successive primitive areas.

4. The method of claim 1, wherein the primary area is before the secondary area when the start point of the primary area is in a preceding region of the secondary area.

5. The method of claim 1, wherein the primary area is after the secondary area when the start point of the primary area is in a following region of the secondary area.

6. The method of claim 1, wherein the primary area is before the secondary area when the interior region of the primary area lies entirely above all columns of the secondary area that have overlapping horizontal extent in the coordinates of the secondary area and when there is more than one such column.

7. The method of claim 1 further comprising assigning an order index to each of the primitive areas according to a position of the primitive area in the transposed sequence.

8. The method of claim 1 further comprising grouping the primitive areas into one or more sections.

9. The method of claim 8 further comprising assigning an order index to each of the primitive areas according to the grouping of primitive areas and the position of the primitive area in the transposed sequence.

10. A non-transitory machine readable medium storing a program which when executed by at least one processing unit, defines a reading order through a plurality of primitive areas of a document page, the program comprising sets of instructions for:

sorting the plurality of primitive areas into a sorted sequence of primitive areas based on a first sorting criteria that compares start points of the primitive areas within the document page, the sorted sequence comprising a first primitive area and a second primitive area subsequent to the first primitive area in the sequence;

comparing the first primitive area and the second primitive area according to a second sorting criteria that compares a location of a start point of the first primitive area relative to a region preceding the second primitive area and a region following the second primitive area;

transposing the first and second primitive areas in the sorted sequence when the start point of the first primitive area is in the region following the second primitive area; and generating an ordered list to define the reading order through the primitive areas based on the transposed sequence of primitive areas.

11. The non-transitory machine readable medium of claim 10, wherein the program further comprises a set of instructions for assigning an order index to each of the primitive areas according to a position of the primitive area in the transposed sequence.

12. The non-transitory machine readable medium of claim 10, wherein the region preceding the second primitive area comprises a region in the document page that precedes the second primitive area in a reading flow of the second primitive area, wherein the region following the second primitive area comprises a region in the document page that follows the second primitive area in the reading flow of the second primitive area.

13. The non-transitory machine readable medium of claim 12, wherein the reading flow of the second primitive area is based on an angle between the second primitive area and a horizontal line in the document page.

14. The non-transitory machine readable medium of claim 10, wherein each of the start points comprises a vertical coordinate and a horizontal coordinate, wherein the first sorting criteria compares the vertical coordinates of the start points.

15. The non-transitory machine readable medium of claim 14, wherein the first sorting criteria compares the horizontal coordinates of the start points when two primitive areas have vertical coordinates that differ by less than a threshold value.

16. A non-transitory machine readable medium storing a program which when executed by at least one processing unit defines a reading order through a plurality of primitive areas of a document page, the program comprising sets of instructions for:

sorting a plurality of primitive areas into a sorted sequence of primitive areas according to a first sorting criteria based on locations of the primitive areas within the document page;

selecting a successive pair of primitive areas in the sorted sequence comprising a first primitive area and a second primitive area;

designating one of the first and second primitive areas as a primary area and the other primitive area as a secondary area based on a comparison of start points of the first and second primitive areas within a coordinate system of the first primitive area and a comparison of start points of the first and second primitive areas within a coordinate system of the second primitive area in order to determine the primary and secondary areas;

comparing a location of the start point of the primary area with respect to the secondary area according to a second sorting criteria;

transposing the two consecutive primitive areas in the sorted sequence of primitive areas when the comparison of the start point of the primary area with respect to the secondary area satisfies the second sorting criteria; and generating an ordered list to define the reading order through the primitive areas based on the transposed sequence of primitive areas.

17. The non-transitory machine readable medium of claim 16, wherein the first sorting criteria is further based on a comparison of start points of the plurality of primitive areas.

18. The non-transitory machine readable medium of claim 16, wherein the second sorting criteria is further based on a reading flow of one of the two consecutive primitive areas.

19. The non-transitory machine readable medium of claim 18, wherein one of the two consecutive primitive areas is a layout area that comprises character glyphs.

20. The non-transitory machine readable medium of claim 18, wherein the reading flow of a particular primitive area is based on an angle between the particular primitive area and a horizontal line in the document page.

\* \* \* \* \*